(12) United States Patent
Toyama et al.

(10) Patent No.: US 10,162,833 B2
(45) Date of Patent: Dec. 25, 2018

(54) WIRELESS ACCESS DEVICE AND WIRELESS ACCESS SYSTEM

(71) Applicant: Panasonic Intellectual Property Management Co., Ltd., Osaka (JP)

(72) Inventors: Masayuki Toyama, Osaka (JP); Takuji Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 494 days.

(21) Appl. No.: 14/739,034

(22) Filed: Jun. 15, 2015

(65) Prior Publication Data
US 2015/0278246 A1 Oct. 1, 2015

Related U.S. Application Data

(63) Continuation of application No. PCT/JP2014/000782, filed on Feb. 17, 2014.

(30) Foreign Application Priority Data

Feb. 20, 2013 (JP) ................................ 2013-030721

(51) Int. Cl.
*G06F 3/06* (2006.01)
*G06F 17/30* (2006.01)
*H04L 29/08* (2006.01)

(52) U.S. Cl.
CPC ........ *G06F 17/30176* (2013.01); *G06F 3/061* (2013.01); *G06F 3/064* (2013.01);
(Continued)

(58) Field of Classification Search
CPC ......... G06F 17/30176; G06F 17/30218; G06F 3/061; G06F 3/0613; G06F 3/064;
(Continued)

(56) References Cited

U.S. PATENT DOCUMENTS 5,276,840 A 1/1994 Yu
6,701,455 B1 3/2004 Yamamoto et al.
(Continued)

FOREIGN PATENT DOCUMENTS

JP 2003-6137 1/2003
JP 2005-149082 6/2005
(Continued)

OTHER PUBLICATIONS

International Search Report dated Apr. 22, 2014 in International (PCT) Application No. PCT/JP2014/000782.
(Continued)

*Primary Examiner* — Michael Krofcheck
*Assistant Examiner* — William E. Baughman
(74) *Attorney, Agent, or Firm* — Wenderoth, Lind & Ponack L.L.P.

(57) ABSTRACT

The present disclosure provides a method of copying files at a high speed when accesses to both of a local memory physically connected to an access device and a remote memory connected via a wireless network. A file copy controller in the access device generates a FS transfer list in which logical address positions of copy sources and logical address positions of copy destinations are stored, based on file system management information of the local memory and an access list, obtained from another access device, of the remote memory, and inputs the FS transfer list to a non-volatile memory controller connected to the local memory. The non-volatile memory controller copies data between the local memory and the remote memory based on the information stored in the FS transfer list without using a CPU in the access device or an internal bus connected to the CPU.

14 Claims, 28 Drawing Sheets

(52) U.S. Cl.
CPC .............. *G06F 3/065* (2013.01); *G06F 3/067* (2013.01); *G06F 3/0613* (2013.01); *G06F 3/0643* (2013.01); *G06F 17/30218* (2013.01); *H04L 67/06* (2013.01)

(58) Field of Classification Search
CPC ........ G06F 3/0643; G06F 3/065; G06F 3/067; H04L 67/06
USPC ........................................................ 711/162
See application file for complete search history.

(56) References Cited

U.S. PATENT DOCUMENTS

| | | | |
|---|---|---|---|
| 7,228,322 B1* | 6/2007 | Kojima | ............. G06F 17/30504 |
| 2003/0018852 A1 | 1/2003 | McLinn | |
| 2003/0167312 A1 | 9/2003 | Mori | |
| 2005/0108472 A1 | 5/2005 | Kanai et al. | |
| 2006/0031650 A1 | 2/2006 | Kanai et al. | |
| 2007/0198798 A1 | 8/2007 | Kanai et al. | |
| 2007/0223472 A1* | 9/2007 | Tachibana | ............... H04L 47/36 370/389 |
| 2010/0091758 A1* | 4/2010 | Goteti | ............... H04W 72/1268 370/345 |
| 2010/0122051 A1 | 5/2010 | Maki et al. | |
| 2011/0022645 A1 | 1/2011 | Maeda et al. | |
| 2011/0302225 A1 | 12/2011 | Maeda et al. | |
| 2012/0084522 A1 | 4/2012 | Shiomi et al. | |
| 2012/0137303 A1* | 5/2012 | Okada | ................... G06F 3/0608 718/104 |
| 2012/0198271 A1 | 8/2012 | Maki et al. | |
| 2012/0317383 A1 | 12/2012 | Lyaskovsky et al. | |
| 2013/0166670 A1* | 6/2013 | Wayda | ................ H04L 67/1095 709/213 |
| 2014/0281809 A1* | 9/2014 | Billa | ................. G06F 17/30327 714/764 |

FOREIGN PATENT DOCUMENTS

| | | |
|---|---|---|
| JP | 4074072 | 4/2008 |
| JP | 2008-258755 | 10/2008 |
| JP | 2009-217707 | 9/2009 |
| JP | 2010-113559 | 5/2010 |
| JP | 2011-138534 | 7/2011 |
| JP | 2012-079183 | 4/2012 |

OTHER PUBLICATIONS

Extended European Search Report dated Feb. 2, 2016 in the corresponding European Patent Application No. 14754081.9.

* cited by examiner

FIG. 11

| Logical cluster number | First FAT 305, second FAT 306 |
|---|---|
| 0x0002 | 0x0003 |
| 0x0003 | 0x0004 |
| 0x0004 | 0x0006 |
| 0x0005 | 0x0000 |
| 0x0006 | 0x0009 |
| 0x0007 | 0x0000 |
| 0x0008 | 0x0000 |
| 0x0009 | 0x000A |
| 0x000A | 0x000B |
| 0x000B | 0x000C |
| 0x000C | 0x000D |
| 0x000D | 0x0010 |
| 0x000E | 0x0000 |
| 0x000F | 0x0000 |
| 0x0010 | 0xFFFF |
| 0x0011 | 0x0000 |
| 0x0012 | 0x0000 |
| 0x0013 | 0x0000 |
| 0x0014 | 0x0000 |
| 0x0015 | 0x0000 |
| 0x0016 | 0x0000 |
| 0x0017 | 0x0000 |
| : | : |

FIG. 13

FS transfer list 121

| List number | Transfer direction | Transfer source logical address | Transfer destination logical address | The number of transfer clusters |
|---|---|---|---|---|
| 1 | L to R | 0x0002 | 0x0003 | 2 |
| 2 | L to R | 0x0004 | 0x0008 | 1 |
| 3 | L to R | 0x0006 | 0x000A | 1 |
| 4 | L to R | 0x0009 | 0x000F | 4 |
| 5 | L to R | 0x000D | 0x0015 | 1 |
| 6 | L to R | 0x0010 | 0x0016 | 1 |

FIG. 18

FS transfer list 123

| List number | Transfer direction | Transfer source logical address | Transfer destination logical address 1 | The number of transfer clusters 1 | Transfer destination logical address 2 | The number of transfer clusters 2 |
|---|---|---|---|---|---|---|
| 1 | L to R | 0x0002 | 0x0003 | 2 | 0x0008 | 1 |
| 2 | L to R | 0x0006 | 0x000A | 1 | 0xFFFF | 0 |
| 3 | L to R | 0x0009 | 0x000F | 4 | 0x0015 | 1 |
| 4 | L to R | 0x0010 | 0x0016 | 1 | 0xFFFF | 0 |

FIG. 19

FS transfer list 124

| List number | Transfer direction | Transfer source logical address 1 | The number of transfer clusters 1 | Transfer source logical address 2 | The number of transfer clusters 2 | Transfer destination logical address |
|---|---|---|---|---|---|---|
| 1 | L to R | 0x0002 | 2 | 0xFFFF | 0 | 0x0003 |
| 2 | L to R | 0x0004 | 1 | 0xFFFF | 0 | 0x0008 |
| 3 | L to R | 0x0006 | 1 | 0xFFFF | 0 | 0x000A |
| 4 | L to R | 0x0009 | 4 | 0xFFFF | 0 | 0x000F |
| 5 | L to R | 0x000D | 1 | 0x0010 | 1 | 0x0015 |

FIG. 20

Access list request (read)

| List number | Transfer direction | File name | File size (the number of clusters) |
|---|---|---|---|
| 1 | R to L | (don't care) | (don't care) |
| 2 | | | |
| 3 | | | |
| 4 | | | |

FIG. 21

Access list request (write)

| List number | Transfer direction | File name | File size (the number of clusters) |
|---|---|---|---|
| 1 | L to R | FNAME1 | 3 |
| 2 | L to R | FNAME2 | 1 |
| 3 | L to R | FNAME3 | 5 |
| 4 | L to R | FNAME4 | 1 |

FIG. 22

Access list (read) 122

| List number | Transfer direction | File name | Transfer source logical address 1 | The number of transfer clusters 1 | Transfer source logical address 2 | The number of transfer clusters 2 |
|---|---|---|---|---|---|---|
| 1 | R to L | FNAME1 | 0x0002 | 2 | 0xFFFF | 0 |
| 2 | R to L | FNAME2 | 0x0004 | 1 | 0xFFFF | 0 |
| 3 | R to L | FNAME3 | 0x0006 | 1 | 0xFFFF | 0 |
| 4 | R to L | FNAME4 | 0x0009 | 4 | 0xFFFF | 0 |
| 5 | R to L | FNAME5 | 0x000D | 1 | 0x0010 | 1 |

FIG. 23

Access list (write) 122

| List number | Transfer direction | File name | Transfer destination logical address 1 | The number of transfer clusters 1 | Transfer destination logical address 2 | The number of transfer clusters 2 |
|---|---|---|---|---|---|---|
| 1 | L to R | FNAME1 | 0x0003 | 2 | 0x0008 | 1 |
| 2 | L to R | FNAME2 | 0x000A | 1 | 0xFFFF | 0 |
| 3 | L to R | FNAME3 | 0x000F | 4 | 0x0015 | 1 |
| 4 | L to R | FNAME4 | 0x0016 | 1 | 0xFFFF | 0 |

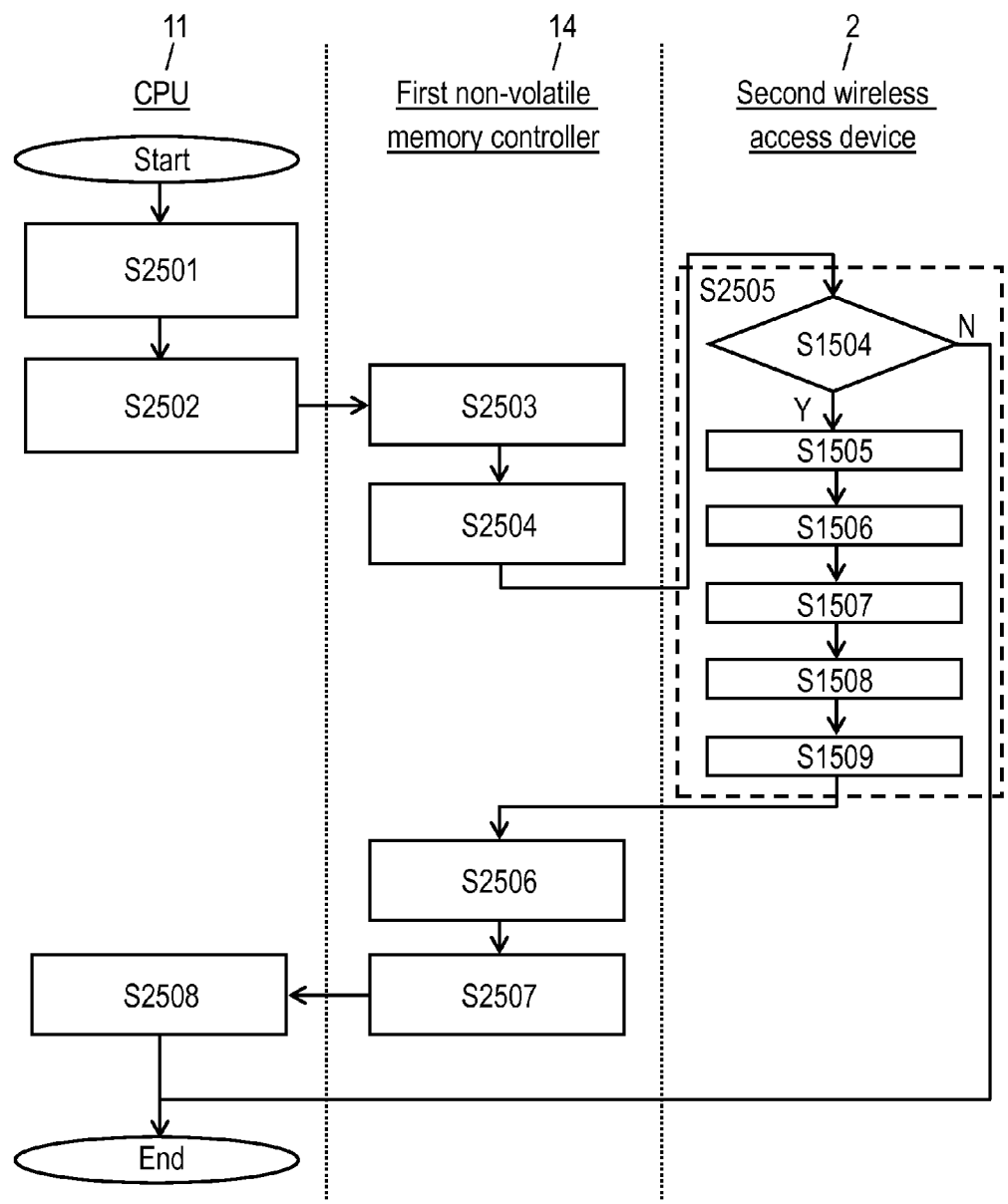

FIG. 26

File list

| List number | Directory/file name | Type | File size (cluster) | Attribute type |
|---|---|---|---|---|
| 1 | FNAME1 | File | 2 | AA |
| 2 | FNAME2 | File | 1 | BB |
| 3 | FNAME3 | File | 1 | CC |
| 4 | FNAME4 | File | 4 | DD |
| 5 | DIR1 | Directory | 1 | EE |
| ⋮ | ⋮ | ⋮ | ⋮ | ⋮ |

Address request

| List number | File name |
|---|---|
| 1 | FNAME1 |
| 2 | FNAME2 |
| 3 | FNAME4 |

Access list (read) 122

| List number | File name | Transfer source logical address 1 | The number of transfer clusters 1 | Transfer source logical address 2 | The number of transfer clusters 2 |
|---|---|---|---|---|---|
| 1 | FNAME1 | 0x0002 | 2 | 0xFFFF | 0 |
| 2 | FNAME2 | 0x0004 | 1 | 0xFFFF | 0 |
| 3 | FNAME4 | 0x0009 | 4 | 0xFFFF | 0 |

FIG. 27

Empty capacity obtaining request

| List number | Request size (the number of clusters) |
|---|---|
| 1 | 3 |
| 2 | 5 |

Access list (write) 122

| List number | Start address 1 | Continuous empty region length 1 | Start address 2 | Continuous empty region length 2 |
|---|---|---|---|---|
| 1 | 0x0003 | 2 | 0x0008 | 1 |
| 2 | 0x000F | 4 | 0x0015 | 1 |

Write file information

| List number | Start logical address 1 | Write file name | Attribute information |
|---|---|---|---|
| 1 | 0x0003 | FNAME1 | xxxx |
| 2 | 0x000F | FNAME2 | yyyy |

FIG. 28

FS transfer list 125

| List number | Transfer direction | Transfer source logical address 1 | The number of transfer clusters 1 | Transfer source logical address 2 | The number of transfer clusters 2 | Transfer destination logical address 1 | The number of transfer clusters 1 | Transfer destination logical address 2 | The number of transfer clusters 2 |
|---|---|---|---|---|---|---|---|---|---|
| 1 | L to R | 0x0002 | 3 | 0xFFFF | 0 | 0x0003 | 2 | 0x0008 | 1 |
| 2 | L to R | 0x0006 | 1 | 0xFFFF | 0 | 0x000A | 1 | 0xFFFF | 0 |
| 3 | L to R | 0x0009 | 5 | 0x0010 | 1 | 0x000F | 6 | 0xFFFF | 0 |

FIG. 29

| Logical cluster number | First FAT 305, second FAT 306 |
|---|---|
| 0x0002 | 0xXXXX |
| 0x0003 | 0x0000 |
| 0x0004 | 0x0000 |
| 0x0005 | 0xXXXX |
| 0x0006 | 0xXXXX |
| 0x0007 | 0xXXXX |
| 0x0008 | 0x0000 |
| 0x0009 | 0xXXXX |
| 0x000A | 0x0000 |
| 0x000B | 0xXXXX |
| 0x000C | 0xXXXX |
| 0x000D | 0xXXXX |
| 0x000E | 0xXXXX |
| 0x000F | 0x0000 |
| 0x0010 | 0x0000 |
| 0x0011 | 0x0000 |
| 0x0012 | 0x0000 |
| 0x0013 | 0x0000 |
| 0x0014 | 0x0000 |
| 0x0015 | 0x0000 |
| 0x0016 | 0x0000 |
| 0x0017 | 0x0000 |
| : | : |

WIRELESS ACCESS DEVICE AND WIRELESS ACCESS SYSTEM

BACKGROUND OF THE INVENTION

1. Field of the Invention

The present disclosure relates to a wireless access device which accesses a non-volatile memory wirelessly connected to the wireless access device, and a wireless access system which has a function of accessing the non-volatile memory wirelessly.

2. Description of the Related Art

There are various types of recording media such as magnetic disks, optical disks, USB memories and flash card memories and these recording media record various types of items of digital data such as text documents, presentation data, music contents and video data. Conventionally, these recording media are mainly used as local storages physically connected directly to host devices such as a PC (Personal Computer), a DSC (Digital Still Camera) or a smartphone which manage data.

However, with development of a cloud computing due to the widespread use of a high-speed wired/wireless network infrastructure, a mode of access to remote storage on a network is being used in various life scenes.

Conventionally, as an example of this mode, a method of mounting a wireless function on a memory card, accessing a large-volume storage such as an external hard disk by wireless communication and reading and writing data has been proposed (e.g. PTL 1). By using this technique, it is possible to manage a memory (remote memory) of an external device on a wireless network as a memory (local memory) directly connected to a wireless access device, and provide advantages of easily adding a capacity to the wireless access device, allowing the remote memory to be used between a plurality of host devices at the same time and the like.

CITATION LIST

Patent Literature

PTL 1: U.S. Patent Publication No. 2003/0018852

SUMMARY OF THE INVENTION

A wireless access device according to the present disclosure is a wireless access device which copies data between a file in a file system constructed on a first non-volatile memory and a file in a file system constructed on a second non-volatile memory in another wireless access device wirelessly connected to the wireless access device. The wireless access device includes an access list controller which obtains an access list which lists copy target regions in the file system constructed on the second non-volatile memory, from the another wireless access device; a file copy controller which identifies a logical address of a transfer source and a logical address of a transfer destination based on first file system management information read from the file system constructed on the first non-volatile memory and the access list, and generates a FS transfer list which lists the logical addresses together with a transfer data size; and a non-volatile memory controller which controls the first non-volatile memory. The file copy controller inputs the generated FS transfer list to the non-volatile memory controller, and the non-volatile memory controller copies data between the first non-volatile memory and the second non-volatile memory based on the FS transfer list.

Consequently, according to the present disclosure, it is possible to copy files at a high speed without depending on performances of a CPU (Central Processing Unit) in a wireless access device and a bus bandwidth when the files are copied between the first non-volatile memory and the second non-volatile memory.

That is, it is possible to copy files at a high speed without depending on performance of the CPU in the wireless access device and a bandwidth of the bus when accesses to both of a local memory connected to the wireless access device and a remote memory connected via a wireless network, and another wireless access device including the remote memory allow to perform access control of controlling whether or not to permit accepting an access to the remote memory from the wireless access device which copies files.

BRIEF DESCRIPTION OF DRAWINGS

FIG. 11 is an explanatory view illustrating an example of a FAT table according to the first exemplary embodiment.

FIG. 13 is an explanatory view illustrating an example of a FS transfer list according to the first exemplary embodiment.

FIG. 18 is an explanatory view illustrating an example of a FS transfer list corresponding to 1-to-n transfer according to the first exemplary embodiment.

FIG. 19 is an explanatory view illustrating an example of the FS transfer list corresponding to n-to-1 transfer according to the first exemplary embodiment.

FIG. 20 is an explanatory view illustrating an example of an access list request when reading according to the first exemplary embodiment.

FIG. 21 is an explanatory view illustrating an example of the access list when writing according to the first exemplary embodiment.

FIG. 22 is an explanatory view illustrating an example of the access list when reading according to the first exemplary embodiment.

FIG. 23 is an explanatory view illustrating an example of the access list when writing according to the first exemplary embodiment.

FIG. 25 is a flowchart illustrating details of a file copy operation procedure according to a third exemplary embodiment.

FIG. 26 is an explanatory view illustrating another example of an access list request and an access list when reading according to another exemplary embodiment.

FIG. 27 is an explanatory view illustrating another example of an access list request and an access list when writing according to another exemplary embodiment.

FIG. 28 is an explanatory view illustrating an example of the FS transfer list corresponding to n-to-1 transfer (n is an integer equal to or more than 1) and 1-to-n transfer (n is an integer equal to or more than 2) according to another exemplary embodiment.

FIG. 29 is an explanatory view illustrating still another example of the FAT table according to the first exemplary embodiment.

DETAILED DESCRIPTION OF THE PREFERRED EMBODIMENTS

Figure 1:
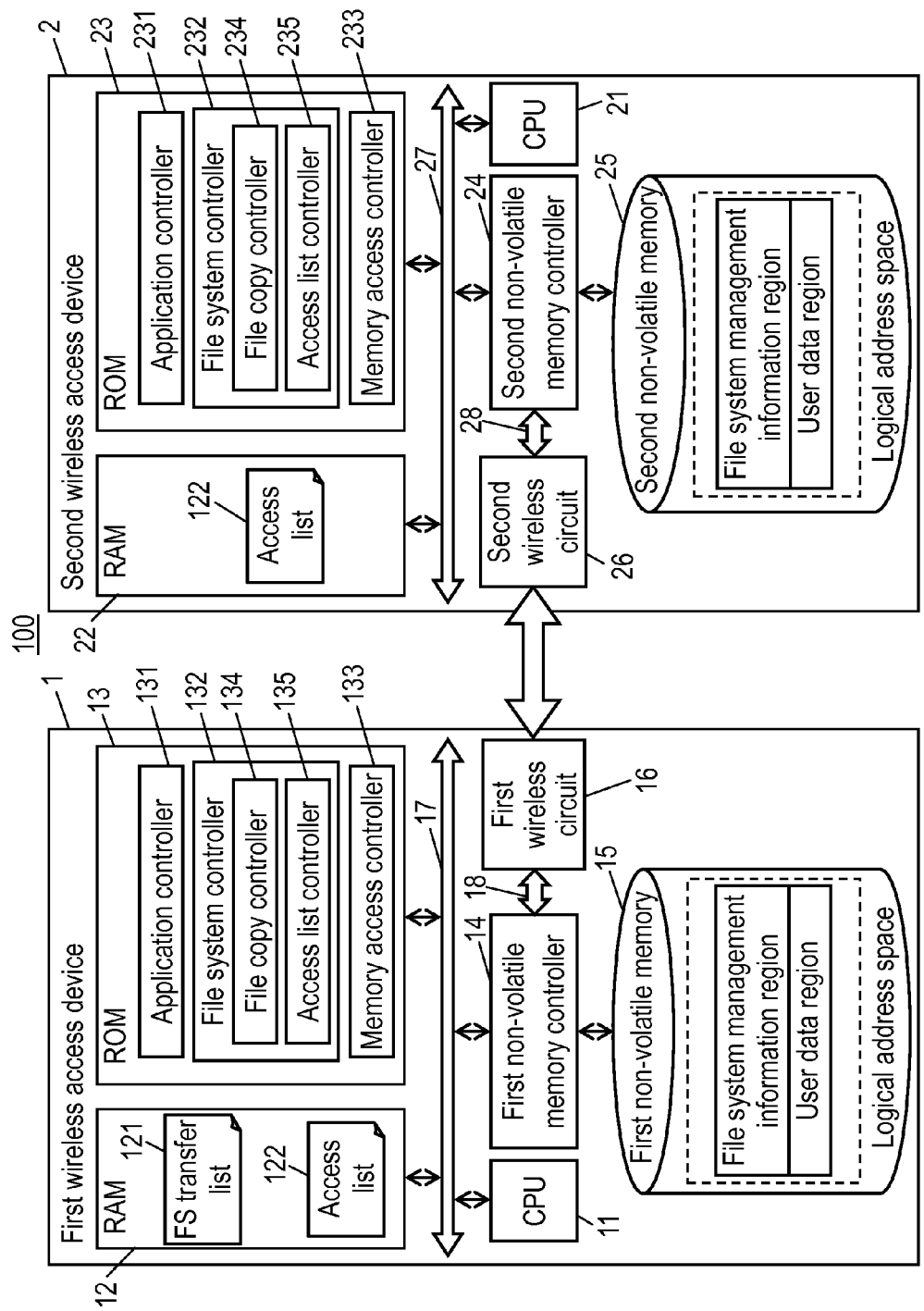
FIG. 1 is a configuration diagram of a wireless access device according to a first exemplary embodiment.

Exemplary embodiments will be described in detail below optionally with reference to the drawings. However, the exemplary embodiments will not be described in detail more than necessary in some cases. For example, in some cases, matters which have already been well known will not be described in detail, and substantially the same components will not be described again.

This is to prevent the following description from being redundant more than necessary, and help those skilled in the art understand the following description.

In addition, the accompanying drawings and the following description are provided to make it easy for those skilled in the art to sufficiently understand the present disclosure, and do not intend to limit the subject matters recited in the claims.

First Exemplary Embodiment

According to a conventional technique, when a remote memory connected via a network is managed and is accessed similar to a local memory directly connected to a wireless access device, the access to the remote memory can be made only by changing a device driver portion which directly accesses the local memory. It is assumed that copying a file between the local memory and the remote memory. Copying file is performed by a control program of a file system running on a CPU of a host device.

For example, the control program of the file system refers to file system management information of both of the local memory and the remote memory, identifies a logical address in which data of a copy source file is stored and identifies a logical address in which data of a copy destination file is stored. Subsequently, the control program of the file system reads data of the copy source file to a RAM (Random Access Memory) in the host device, and writes the read data in a data storage position of the copy destination file. That is, copying files between the local memory and the remote memory is performed in operation of the CPU in the host device through the RAM in the host device. Hence, operation speed of copying files depends on performance of the CPU in the host device, a bandwidth of a bus connected to the RAM in the host device or the like. When these performances are low, copying files cannot be performed at a high speed.

Further, in case of a device such as a PC, a DSC or a smartphone as a built-in memory and has a host function with respect to the memory, while a wireless access device is performing an operation of copying a file, the program which operates on the CPU in the device cannot access the memory in the device. Further, it is not possible to restrict an access to the memory from a wireless access device which is connected via a network and copies files.

In view of the above problem, an object of the present disclosure is to provide a wireless access device, an access device, a wireless information recording device and a wireless access system which, when accesses to both of a local memory connected to the wireless access device and a remote memory connected via a wireless network, copying files is performed at a high speed without depending on performance of a CPU in the access device and without depending on a bandwidth of a bus, and allow the device which has a built-in memory to perform access control of controlling whether or not to permit accepting an access to the memory of a device which copies files.

FIG. 1 is a configuration diagram of a wireless access device and a wireless access system according to the present exemplary embodiment. In FIG. 1, wireless access system 100 includes first wireless access device 1 and second wireless access device 2. First wireless access device 1 manages first non-volatile memory 15 included in first wireless access device 1 as a local memory. Further, second wireless access device 2 manages second non-volatile memory 25 included in second wireless access device 2 as a local memory. First wireless access device 1 includes CPU 11, RAM 12, ROM (Read Only Memory) 13 and first non-volatile memory controller 14 which are connected with each other through first internal bus 17. First wireless access device 1 further includes first non-volatile memory 15 connected to first non-volatile memory controller 14, and first wireless circuit 16 connected through second internal bus 18. Programs which control the first wireless access device 1 are stored in ROM 13, and these programs use RAM 12 as a temporary memory region and operate on CPU 11.

First non-volatile memory controller 14 actually issues a Read command, a Write command and other control commands to first non-volatile memory 15, and controls reading and writing of first non-volatile memory 15.

Further, first wireless circuit 16 is a control circuit which wirelessly communicates with second wireless access device 2, and is, for example, a control circuit which supports wireless LAN (Local Area Network) standards of 802.11a/b/g/n, control circuits which support wireless LAN standards of 802.11ac and 802.11ad which are expected to be spread in future, and other control circuits for wireless communication such as Bluetooth (registered trademark) and Transfer Jet (registered trademark) of a near field wireless transfer technique. The present disclosure is not limited to a particular wireless communication method, so that it is possible to use an arbitrary wireless control circuit as first wireless circuit 16.

ROM 13 further includes application controller 131, file system controller 132 and memory access controller 133. Application controller 131 generates data and controls a power source, that is, controls entire first wireless access device 1. File system controller 132 performs control of managing data in first non-volatile memory 15 and second non-volatile memory 25 as files using a file system such as a FAT file system. Memory access controller 133 receives an access size and an access destination logical address together with the data from file system controller 132, and records data of a specified size in a specified logical address in first non-volatile memory 15 or second non-volatile memory 25, that is, controls transmission and reception of commands and data to first non-volatile memory 15 and second non-volatile memory 25.

File system controller 132 further includes file copy controller 134 and access list controller 135. File copy controller 134 is a controller which performs file copy operation between first non-volatile memory 15 and second non-volatile memory 25, which is a feature of the present disclosure, and is not included in a conventional wireless access device. First non-volatile memory controller 14 also has a function of controlling FS transfer list 121 which is a file system transfer list described below, and is not included in the conventional access device.

Further, access list controller 135 performs control of obtaining access list 122 described later from second wireless access device 2 and specifying an accessible memory region in second non-volatile memory 25 which is the remote memory, and is not included in the conventional access device.

In addition, the present exemplary embodiment will be described assuming that access list controller 135 is configured to be included in file system controller 132. However, access list controller 135 may be configured in other ways without departing from the spirit of the present disclosure, and may be configured to be included in application controller 131 or memory access controller 133, or may be configured as an independent program in ROM 13.

Meanwhile, in FIG. 1, second wireless access device 2 includes CPU 21, RAM 22, ROM 23 and second non-volatile memory controller 24 which are connected with each other through first internal bus 27. Second wireless access device 2 further includes second non-volatile memory 25 connected to second non-volatile memory controller 24, and second wireless circuit 26 connected through second internal bus 28. Programs which controls second wireless access device 2 are stored in ROM 23 and these programs use RAM 22 as a temporary memory region and operate on CPU 21. Second non-volatile memory controller 24 actually issues a Read command, a Write command and other control commands to second non-volatile memory 25, and controls reading and writing of second non-volatile memory 25. Further, second wireless circuit 26 is a control circuit which wirelessly communicates with first wireless access device 1, and can perform arbitrary wireless communication with first wireless circuit 16. An internal configuration of second wireless access device 2 is the same as an internal configuration of first wireless access device 1.

In the present exemplary embodiment, second wireless access device 2 will be described as a device that second non-volatile memory 25 included in second wireless access device 2 is a remote memory which first wireless access device 1 can access. That is, second wireless access device 2 notifies first wireless access device 1 of a memory region which first wireless access device 1 can access among memory regions in second non-volatile memory 25 included in second wireless access device 2 using access list 122, and operates as a device that second non-volatile memory 25 is a remote memory which first wireless access device 1 can access. CPU 21 in second wireless access device 2 transmits access list 122 to first wireless access device 1 and then second non-volatile memory controller 24 controls access to second non-volatile memory 25 from first wireless access device 1, and CPU 21 in second wireless access device 21 does not control the access.

Figure 2:
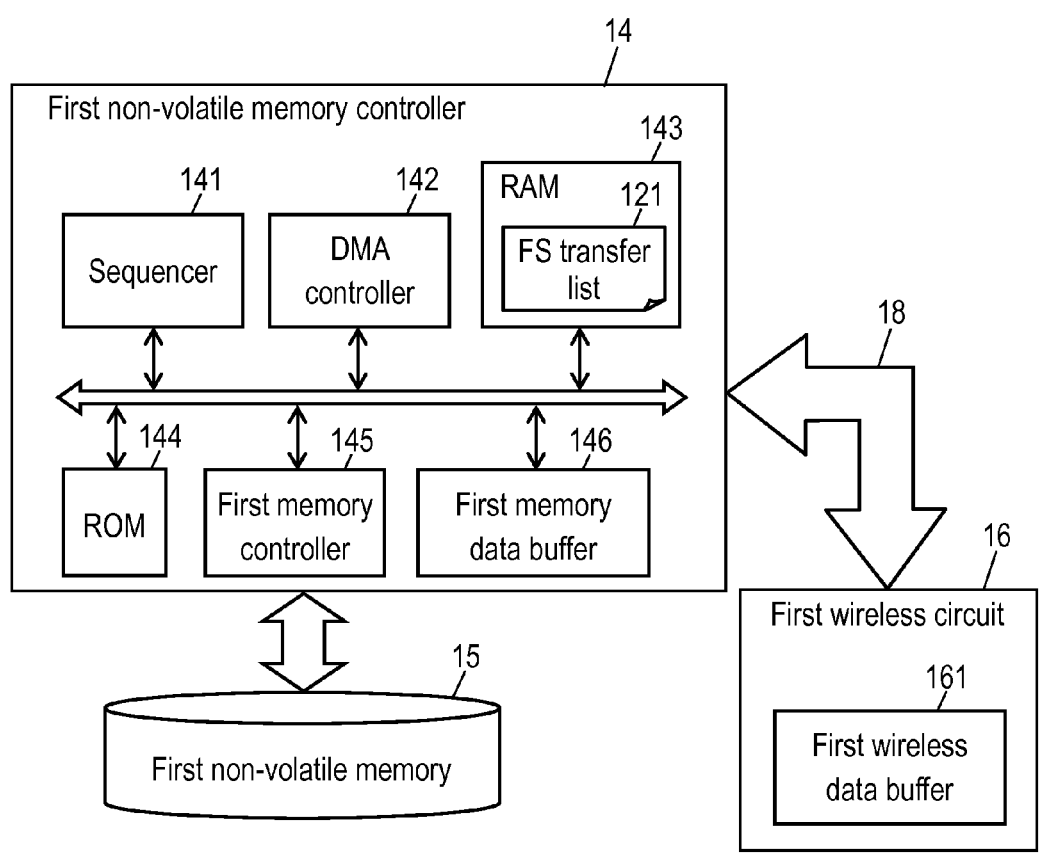
FIG. 2 is a configuration diagram of a first non-volatile memory controller according to the first exemplary embodiment.

Subsequently, configurations of first non-volatile memory controller 14 and second non-volatile memory controller 24 according to the present exemplary embodiment will be described with reference to FIGS. 2 and 3. In FIG. 2, first non-volatile memory controller 14 includes sequencer 141, DMA (Direct Memory Access) controller 142, RAM 143, ROM 144, first memory controller 145 and first memory data buffer 146. Sequencer 141 is a controller which controls first non-volatile memory controller 14, and performs various types of operation with microcodes stored in ROM 144.

Sequencer 141 performs only limited operation in first non-volatile memory controller 14, and therefore may be realized using another control circuit such as a small microcomputer.

DMA controller 142 is a controller which controls DMA (Direct Memory Access) transfer of various items of data between each component in first non-volatile memory controller 14 and first wireless data buffer 16 in first wireless circuit 16.

First memory controller 145 is a controller which actually issues a Read command, a Write command and other control commands to first non-volatile memory 15, and accesses to first non-volatile memory 15.

First memory data buffer 146 is a buffer which stores data read from first non-volatile memory 15 or data written in first non-volatile memory 15 during the access to first non-volatile memory 15. First non-volatile memory controller 14, according to the present exemplary embodiment, receives an input of FS transfer list 121 from CPU 11, and sequencer 141 interprets FS transfer list 121 and accesses first non-volatile memory 15 and second non-volatile memory 25.

Figure 3:
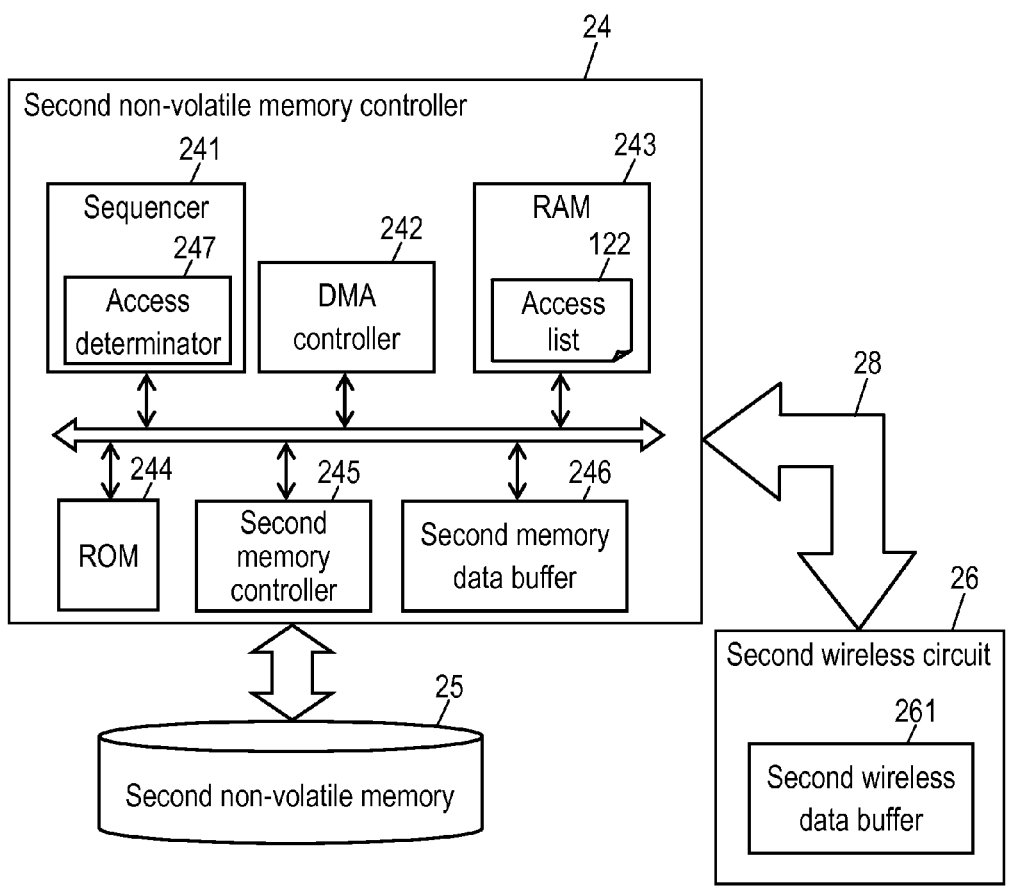
FIG. 3 is a configuration diagram of a second non-volatile memory controller according to the first exemplary embodiment.

In FIG. 3, second non-volatile memory controller 24 includes sequencer 241, DMA controller 242, RAM 243, ROM 244, second memory controller 245 and second memory data buffer 246. Sequencer 241 is a controller which controls second non-volatile memory controller 24, and performs various types of operation with microcodes stored in ROM 244.

Sequencer 241 performs only limited operation in second non-volatile memory controller 24, and therefore may be realized using another control circuit such as a small microcomputer.

DMA controller 242 is a controller which controls DMA transfer of various data between each component in second non-volatile memory controller 24 and second wireless data buffer 261 in second wireless circuit 26.

Second memory controller 245 is a controller which actually issues a Read command, a Write command and other control commands to second non-volatile memory 25, and accesses to second non-volatile memory 25. Sequencer 241 includes access determination unit 247. RAM 243 holds access list 122. Access determination unit 247 determines whether or not an access from first wireless access device 1 to second non-volatile memory 25 can be accepted referring to access list 122 held in RAM 243.

With this configuration, in the present exemplary embodiment, file system controller 132 in first wireless access device 1 manages first non-volatile memory 15 in first wireless access device 1 as the local memory and second non-volatile memory 25 in second wireless access device 2 as the remote memory, and access list controller 135 in first wireless access device 1 receives access list 122 from access list controller 235 in second wireless access device 2, and copies files at a high speed in collaboration with file copy controller 134 and first non-volatile memory controller 14.

The high speed copy according to the present exemplary embodiment will be described in detail below.

Upon high speed file copy operation according to the present exemplary embodiment, first non-volatile memory controller 14 actually performs data copy operation based on FS transfer list 121 generated by file copy controller 134. FS transfer list 121 will be described later in detail. This FS transfer list 121 is generated based on region management information included in file system management information and access list 122, and therefore both FS transfer list 121 and access list 122 are associated with the file system management information. Hence, a FAT (File Allocation Table) file system will be described as an example of a file system. The FAT file system will be described as an example in the present exemplary embodiment. However, the present exemplary embodiment is not limited to a type of a file system, and is applicable to other file systems such as a UDF (Universal Disc Format) and a NTFS (NT File System).

Figure 4:
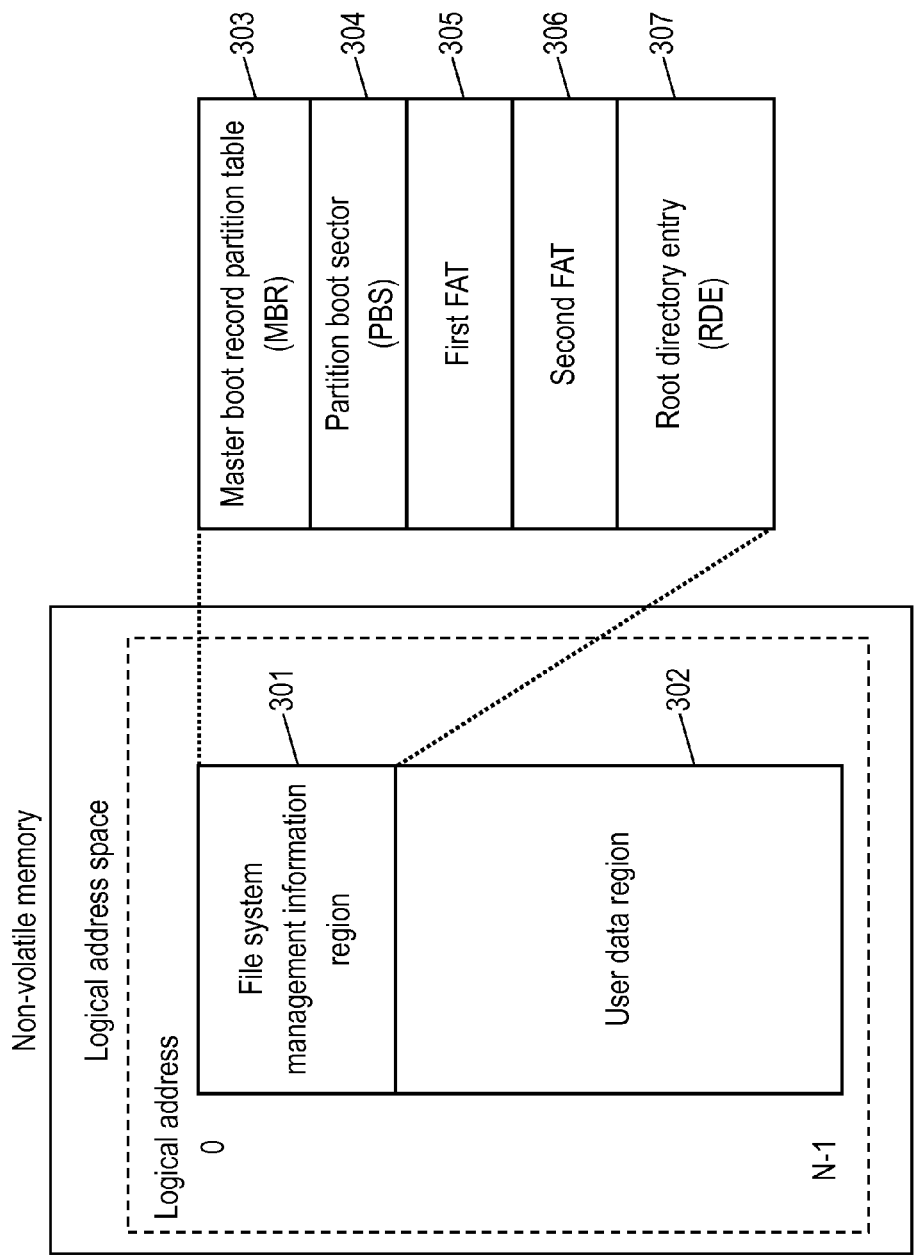
FIG. 4 is a configuration diagram of a FAT (File Allocation Table) file system according to the first exemplary embodiment.

FIG. 4 is a configuration diagram of the FAT file system. The FAT file system includes types of FAT 12 (a FAT using a cluster identifier of 12 bits), FAT 16 (a FAT using a cluster identifier of 16 bits) and FAT 32 (a FAT using a cluster identifier of 32 bits) based on differences between bit widths of management units. However, a region management method using the FAT is the same, and therefore FAT 16 will be described below as an example. As shown in FIG. 4, the FAT file system includes file system management information region 301 which is a region in which management information of a file system such as a region allocation unit and a size of a region managed by the file system are stored at a head of a logical address space, and user data region 302 which is a region in which there are actual file data and a directory.

File system management information region 301 includes file system management information called master boot record partition table 303, partition boot sector 304, first FAT 305, second FAT 306 and root directory entry 307, and file system management information is information required to manage user data region 302. Master boot record partition table 303 is a region in which information, for dividing a region on a logical address managed by the file system into a plurality of regions called partitions and for managing the region, is stored. Partition boot sector 304 is a region in which management information of one partition, such as a size of a region management unit of a partition, is stored. First FAT 305 and second FAT 306 are regions, in which information related to a storage position of data included in a file, is stored. Generally, two FATs including the same information are dually provided to allow second FAT 306 which is one FAT to access to a file even when, for example, first FAT 305 which is the other FAT is corrupted. Root directory entry 307 is a region in which a file and directory information (directory entry), just below a root directory, are stored.

User data region 302 is divided and managed per management unit called a cluster having a size of about 512 bytes to 32 KB, and data included in a file is stored in each cluster. Data included in a file including multiple items is stored over a plurality of clusters, and a connection between the clusters is managed by link information stored in first FAT 305 and second FAT 306. Further, a directory entry, which is information of a file and a subdirectory in a directory just below the root directory, is stored using part of this user data region 302.

Figure 5:
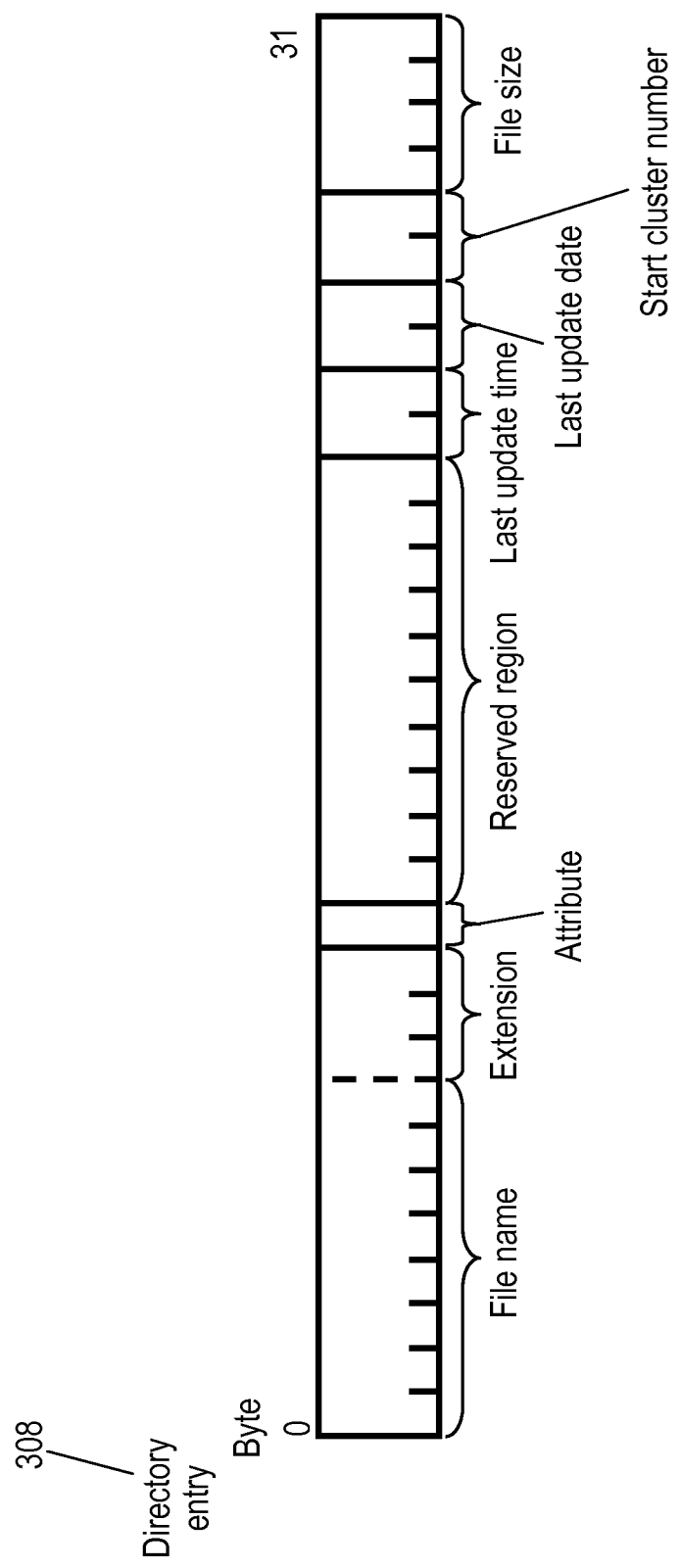
FIG. 5 is a configuration diagram of a directory entry according to the first exemplary embodiment.

FIG. 5 is a configuration diagram of a directory entry of FAT 16. Directory entry 308 of 32 bytes is allocated per file and directory, and information related to the file and the directory is stored in directory entry 308. That is, information of directory entry 308 of 32 bytes is newly created every time one file or one directory is added, and is stored in a region of root directory entry 307 or user data region 302. In 8 bytes at a head of directory entry 308, names of the file or the directory is stored. In subsequent 3 bytes, an extension of the file or the directory is stored. In subsequent 1 byte, attribute information such as a flag for identifying a type of the file/directory, a flag for identifying whether or not the file/directory is read-only or the like is stored. Further, there is a reserved region, and then information of a last update date of the file/directory, a start cluster number indicating a start position of a cluster in which an entity of file/directory data is stored, and a number of bytes of a file size are stored.

Thus, directory entry 308 holds only information related to the position of the cluster in which the head data of the file is stored, and therefore, when file data is stored over a plurality of clusters, the position information of the clusters is held in first FAT 305 and second FAT 306. That is, to update a file, file data needs to be written and information of directory entry 308, first FAT 305 and second FAT 306 also need to be written.

Figure 6A:
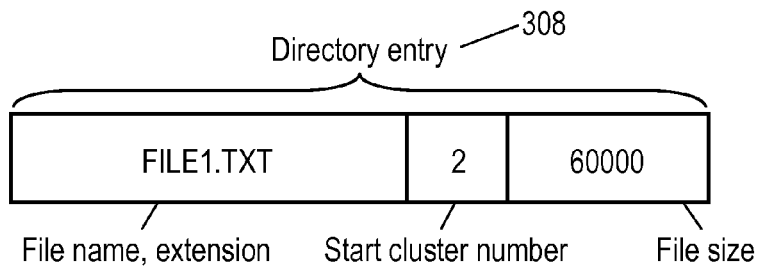
FIG. 6A is an explanatory view illustrating an example of a directory entry of the FAT file system according to the first exemplary embodiment.
Figure 6B:
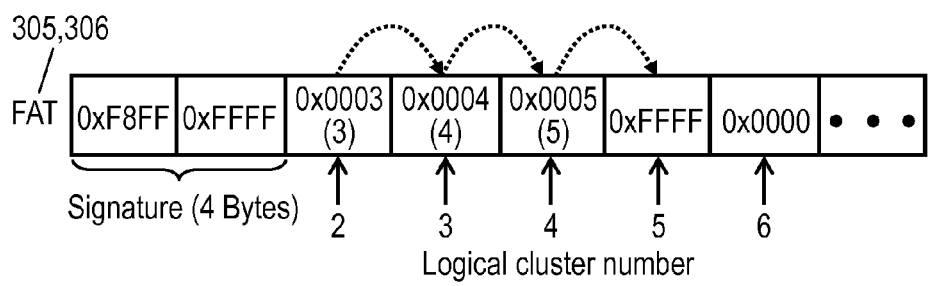
FIG. 6B is a view illustrating an example of a first FAT and a second FAT of the FAT file system according to the first exemplary embodiment.
Figure 6C:
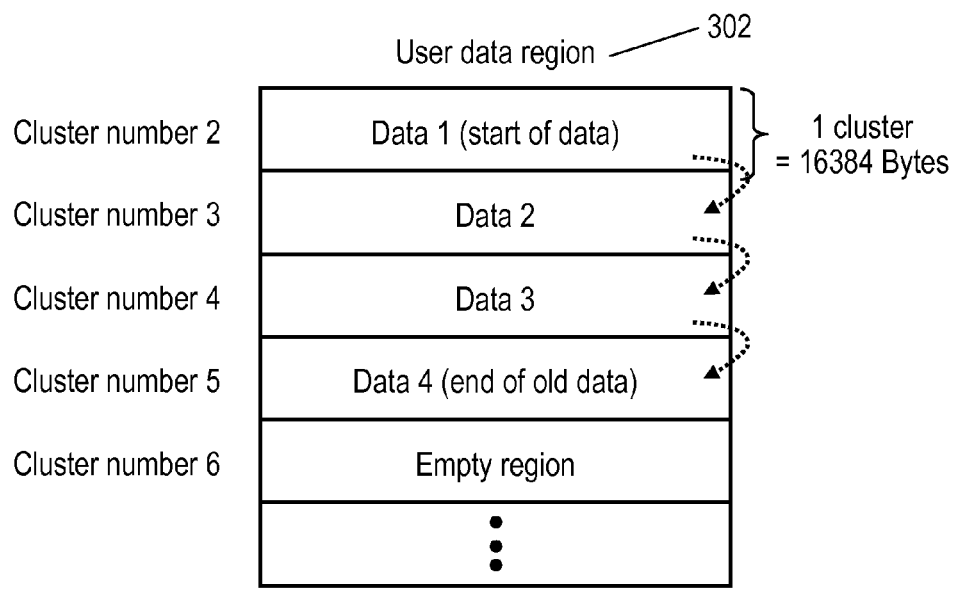
FIG. 6C is a view illustrating an example of a user data region of the FAT file system according to the first exemplary embodiment.

FIGS. 6A, 6B and 6C are explanatory views illustrating an example of file system management information and user data in the FAT file system of FAT 16. FIG. 6A is an example of directory entry 308, and shows that a file having a size of 60000 bytes with a name of "FILE1.TXT" is stored. Further, FIG. 6A shows that a data body of this file is stored in a region whose logical cluster number starts from 2. FIG. 6B is an example of first FAT 305 and second FAT 306 of FAT 16. In four bytes at heads of first FAT 305 and second FAT 306, fixed values are stored as signatures. However, the other regions are associated with logical clusters in each user data region 302 in 16 bit units. For example, 16 bits immediately after the signatures at the heads of first FAT 305 and second FAT 306 are associated with logical cluster number 2 and subsequent 16 bits are associated with logical cluster number 3, and 16 bits are each associated with logical cluster numbers in ascending order. A value stored in each 16 bit indicates a state of the associated logical cluster number. For example, 0x0000 means that a region of an associated logical cluster number is an empty cluster. From 0x0002 to 0xFFF6 mean logical cluster numbers of next regions linked to regions of associated logical cluster numbers. From 0xFFF8 to 0xFFFF mean that regions of associated logical cluster numbers are ends of links. In FIG. 6B, that is, an example of first FAT 305 and second FAT 306 indicates that the data body of "FILELTXT" is stored in regions of cluster numbers 2, 3, 4 and 5. Further, in FIG. 6C, an example of user data region 302 indicates that the data body of "FILELTXT" is actually stored in the regions of logical cluster numbers 2, 3, 4 and 5.

Thus, in the FAT file system, first FAT 305 and second FAT 306 manage user data region 302, second wireless access device 2 generates access list 122 based on first FAT 305 and second FAT 306 constructed on second non-volatile memory 25, and first wireless access device 1 generates FS transfer list 121 based on first FAT 305 and second FAT 306 constructed on first non-volatile memory 15, and access list 122 and performs file copy operation.

Figure 7:
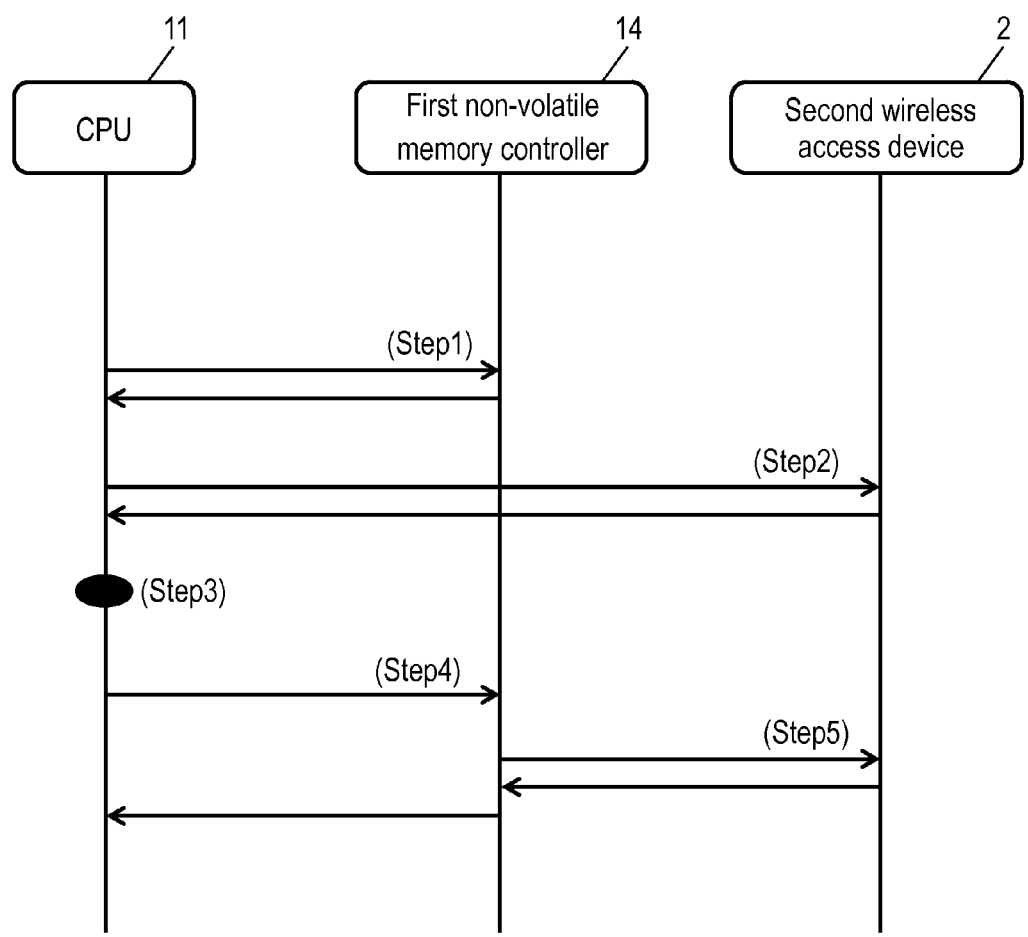
FIG. 7 is a flowchart illustrating an outline of a file copy operation procedure according to the first exemplary embodiment.

Next, an outline of the file copy operation according to the present exemplary embodiment will be described. FIG. 7 is a view illustrating a flowchart of the file copy operation procedure. Upon the file copy operation according to the present exemplary embodiment, access list controller 135 which operates on CPU 11 obtains access list 122 from access list controller 235 which operates on CPU 21, and then file copy controller 134 which operates on CPU 11, first non-volatile memory controller 14 and second non-volatile memory controller 24 in second wireless access device 2 copy files at a high speed from first non-volatile memory 15 to second non-volatile memory 25 or from second non-volatile memory 25 to first non-volatile memory 15 using FS transfer list 121. The file copy operation according to the present exemplary embodiment includes the following five steps.

(Step 1) File copy controller 134 which operates on CPU 11 reads file system management information from first non-volatile memory 15 through first non-volatile memory controller 14. With this, file copy controller 134 identifies a logical address at which a data body of a transfer source file existing on first non-volatile memory 15 is stored or a logical address of an empty cluster used to store data of a transfer destination file on first non-volatile memory 15.

(Step 2) Access list controller 135 which operates on CPU 11 obtains access list 122 from access list controller 235 which operates on CPU 21 in second wireless access device 2. With this, access list controller 135 identifies a logical address of an empty cluster used to store data of a transfer destination file on second non-volatile memory 25 or a logical address at which transfer source file data existing on second non-volatile memory 25 is stored. That is, instead of reading file system management information of second non-volatile memory 25, CPU 11 obtains only information which is required for file copy operation and whose memory region is on second non-volatile memory 25.

(Step 3) File copy controller 134 which operates on CPU 11 generates FS transfer list 121 based on the file system management information of first non-volatile memory 15 read in Step 1 and access list 122 obtained in Step 2.

(Step 4) File copy controller 134 which operates on CPU 11 transmits FS transfer list 121 generated in Step 3 to first non-volatile memory controller 14, and instructs file copy operation. Subsequently, until the file copy operation is completed, first non-volatile memory controller 14 performs actual copy operation, and file copy controller 134 which operates on CPU 11 stands by until that the completion of the file copy operation is notified.

(Step 5) First non-volatile memory controller 14 receives FS transfer list 121 transmitted in Step 4, and actually performs data copy operation according to description contents.

Thus, in the file copy operation according to the present exemplary embodiment, file copy controller 134 which operates on CPU 11 generates FS transfer list 121, and first non-volatile memory controller 14 performs actual copy operation based on FS transfer list 121. With this, CPU 11 and first internal bus 17 are not involved in actually copying data, so that it is possible to copy files at a high speed without depending on performances of CPU 11 and first internal bus 17.

Figure 8:
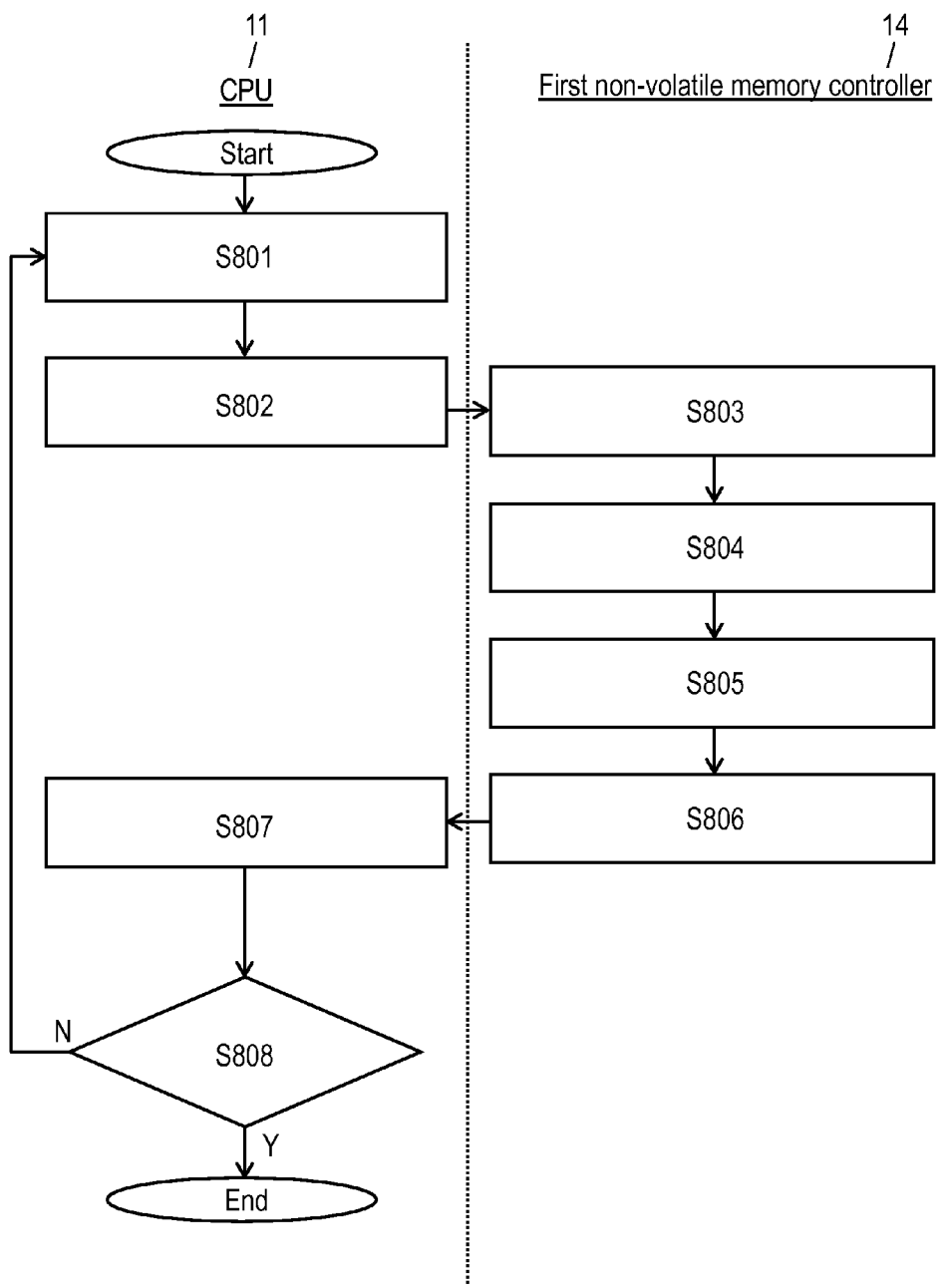
FIG. 8 is a flowchart illustrating a detail (Step 1) of the file copy operation procedure according to the first exemplary embodiment.

Next, an operation procedure of Step 1 will be described in detail with reference to FIG. 8. In operation in Step 1, file copy controller 134 which operates on CPU 11 and first non-volatile memory controller 14 read file system management information from first non-volatile memory 15. The operation in Step 1 is operation which is commonly applied both to copy a file from first non-volatile memory 15 to second non-volatile memory 25 and to copy a file from second non-volatile memory 25 to first non-volatile memory 15.

(S801) File copy controller 134 which operates on CPU 11 identifies a logical address on first non-volatile memory 15, from file system management information such as first FAT 305, second FAT 306 and directory entry 308. More specifically, file copy controller 134 first identifies as an access region a head region of the logical address space in which master boot record partition table 303 is stored.

(S802) File copy controller 134 which operates on CPU 11 issues a Read instruction with respect to the logical address specified by the operation in S801, to first non-volatile memory controller 14.

(S803) Sequencer 141 in first non-volatile memory controller 14 receives the Read instruction issued by the operation in S802, and generates a command packet for reading from the identified logical address. A recording medium which is used for first non-volatile memory 15 is, for example, a SD (Secure Digital) memory card, a hard disk connected by a SATA (Serial Advanced Technology Attachment) connection method or the like. Further, a protocol for an access is defined in each recording medium. Hereinafter, sequencer 141 generates a command packet required to perform read operation according to various protocols for accessing first non-volatile memory 15.

(S804) Sequencer 141 in first non-volatile memory controller 14 inputs the command packet generated by the operation in S803, to first memory controller 145.

(S805) First memory controller 145 in first non-volatile memory controller 14 transmits the inputted command packet to first non-volatile memory 15, and reads data from first non-volatile memory 15. The read data is stored in first memory data buffer 146.

(S806) Sequencer 141 in first non-volatile memory controller 14 notifies file copy controller 134 which operates on CPU 11 that the Read operation has been completed.

(S807) File copy controller 134 which operates on CPU 11 transfers the read data from first memory data buffer 146 to RAM 12 in first wireless access device 1. With this operation, one operation of reading file system management information is completed.

(S808) File copy controller 134 which operates on CPU 11 checks whether or not reading all pieces of file system management information to access a file has been completed. When reading the file system management information has not been completed (N), the flow returns to S801 and file copy controller 134 continues the operation of reading the file system management information. When reading the file system management information has been completed (Y), the operation in Step 1 is completed. For example, in a case of the FAT file system, to access a file, file copy controller 134 reads regions of master boot record partition table 303, partition boot sector 304, first FAT 305, second FAT 306 and root directory entry 307 in order and, if necessary, file copy controller 134 reads directory entry 308 of a subdirectory. The operation in S801 to S807 is repeatedly performed with respect to the file system management information to read these regions.

Figure 9:
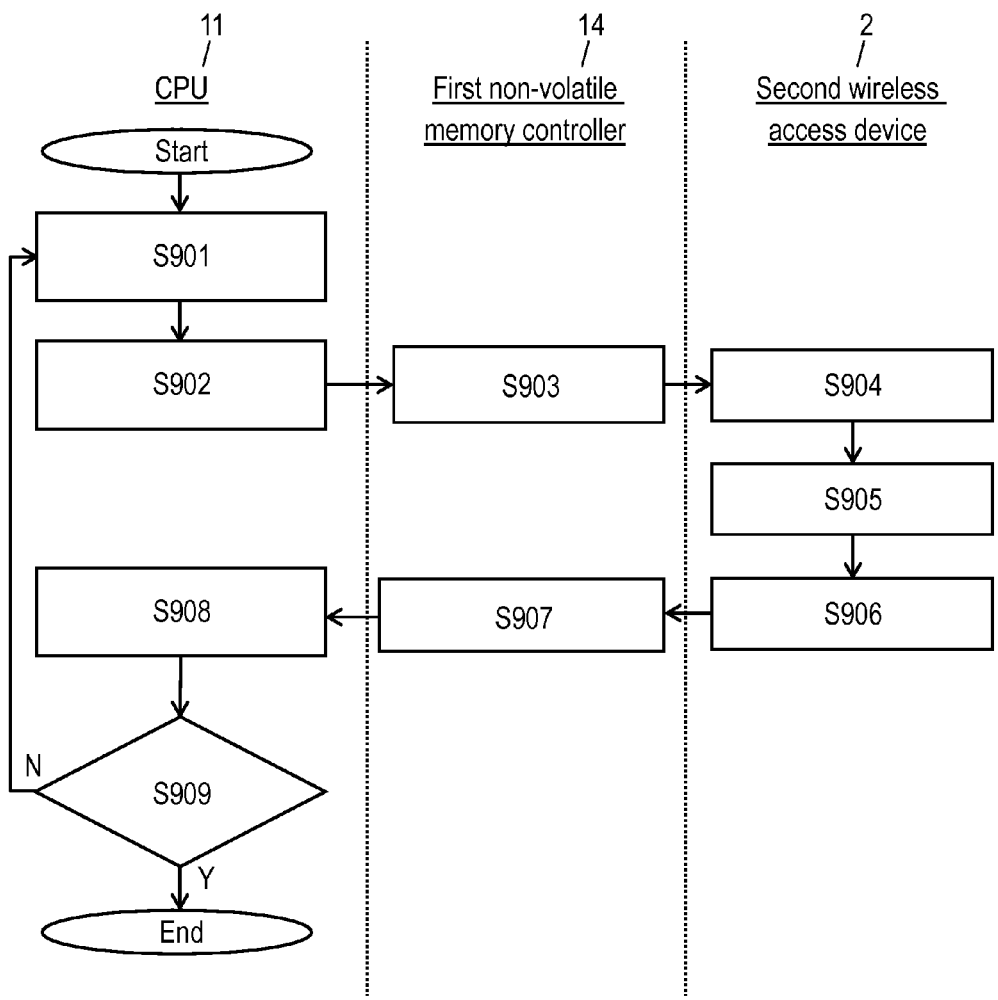
FIG. 9 is a flowchart illustrating a detail (Step 2) of the file copy operation procedure according to the first exemplary embodiment.

Next, an operation procedure of Step 2 will be described in detail with reference to FIG. 9. In the operation in Step 2, access list controller 135 which operates on CPU 11 obtains an access list from access list controller 235 which operates on CPU 21 in second wireless access device 2. The operation in Step 2 is operation which is commonly applied both to copying files from first non-volatile memory 15 to second non-volatile memory 25 and to copying files from second non-volatile memory 25 to first non-volatile memory 15.

(S901) Access list controller 135 which operates on CPU 11 generates an access list request to be transmitted to second wireless access device 2 in order to obtain information of the memory region on second non-volatile memory 25 which is required for file copy operation. FIG. 20 is a view illustrating an access list request when reading from second non-volatile memory 25, and FIG. 21 is a view illustrating an example of an access list request when writing in second non-volatile memory 25. The access list request is a list including transfer directions indicating data copy directions, and file names and sizes of files to be transferred. FIG. 20 illustrates an example of the access list request when a file in second non-volatile memory 25 is copied to first non-volatile memory 15. A transfer direction "R to L" means a copy from second non-volatile memory 25 to first non-volatile memory 15. A file name and a number of clusters indicating a file size mean information for identifying a file to be copied. The number of clusters is the number of clusters such as 32 KB which is a logical region management unit of the file system. When a file to be copied cannot be identified in advance before copying from second non-volatile memory 25 to first non-volatile memory 15, a file name and the number of clusters are arbitrary (don't care) as shown in FIG. 20. FIG. 21 illustrates an example of the access list request when a file in first non-volatile memory 15 is copied to second non-volatile memory 25. A transfer direction "L to R" means a copy from first non-volatile memory 15 to second non-volatile memory 25. The file name and a number of clusters mean information for identifying a file to be copied in case of a copy from first non-volatile memory 15 to second non-volatile memory 25. In the example in FIG. 21, file names and the numbers of clusters of files to be copied are "FNAME1" and "3", "FNAME2" and "1", "FNAME3" and "5", and "FNAME4" and "1" in order.

In addition, the file name only needs to identify a file to be copied, and only needs to be arbitrary information such as an identifier or an ID number which is commonly identifiable between first wireless access device 1 and second wireless access device 2.

Although in the above example, a file size is managed in cluster units, a file size to be copied only needs to be identified, and a file size may be managed in sector units such as 512 B which is a minimum access unit of first non-volatile memory 15 and second non-volatile memory 25 other than clusters.

(S902) Access list controller 135 which operates on CPU 11 issues a transmission instruction of the access list request generated by the operation in S901, to first non-volatile memory controller 14.

(S903) Sequencer 141 in first non-volatile memory controller 14 generates a wireless packet for transmitting the transmission instruction of the access list request issued by the operation in S902, to second wireless access device 2, and transmits the wireless packet to second wireless access device 2 through first wireless circuit 16.

(S904) Access list controller 235 which operates on CPU 21 in second wireless access device 2 reads the access list request received from first wireless access device 1 and the file system management information of second non-volatile memory 25, and generates an access list from file system management information of second non-volatile memory 25.

First, access list controller 235 reads the file system management information of second non-volatile memory 25. Access list controller 235 may read the file system management information of second non-volatile memory 25 in advance and store the file system management information in RAM 22, or may read the file system management information after receiving the access list request from first wireless access device 1.

File copy controller 234 which operates on CPU 21 identifies a logical address on second non-volatile memory 25, from the file system management information such as first FAT 305, second FAT 306 and directory entry 308. More specifically, file copy controller 234 first identifies a head region of the logical address space in which master boot record partition table 303 is stored, as an access region.

Next, file copy controller 234 which operates on CPU 21 issues a Read instruction with respect to the identified logical address, to second non-volatile memory controller 24.

Sequencer 241 in second non-volatile memory controller 24 receives the issued Read instruction, and generates a command packet for reading with respect to the identified logical address. A recording medium which is used for second non-volatile memory 25 is, for example, a SD memory card, a hard disk connected by a SATA connection method or the like. Further, a protocol for an access is defined in each recording medium. Hereinafter, sequencer 241 generates a command packet required to perform read operation in accordance with various protocols for accessing second non-volatile memory 25. Sequencer 241 in second non-volatile memory controller 24 inputs the generated command packet to second memory controller 245. Second memory controller 245 in second non-volatile memory controller 24 transmits the inputted command packet to second non-volatile memory 25, and reads data from second non-volatile memory 25. The read data is stored in second memory data buffer 246. Sequencer 241 in second non-volatile memory controller 24 notifies file copy controller 234 which operates on CPU 21 that the Read operation has been completed.

File copy controller 234 which operates on CPU 21 transfers the read data from second memory data buffer 246 to RAM 22 in second wireless access device 2. With this operation, one operation of reading file system management information is completed.

File copy controller 234 which operates on CPU 21 checks whether or not reading all pieces of file system management information to access a file has been completed. When reading the file system management information is not completed, file copy controller 234 continues the operation of reading the file system management information. When reading the file system management information is completed, the operation is completed. In case of the FAT file system, for example, to access a file, regions of master boot record partition table 303, partition boot sector 304, first FAT 305, second FAT 306 and root directory entry 307 are read in order and, if necessary, directory entry 308 of a subdirectory is read. The operation is repeatedly performed with respect to the file system management information to read these regions.

FIG. 22 is a view illustrating an example of an access list when reading from second non-volatile memory 25, and FIG. 23 is a view illustrating an example of an access list when writing in second non-volatile memory 25. The access list in FIG. 22 is an access list generated in response to the access list request in FIG. 20, and the access list in FIG. 23 is an access list generated in response to the access list request in FIG. 21.

The access list is a list including transfer directions indicating copy destinations and copy sources, file names of files to be transferred, and transfer target logical addresses and sizes on second non-volatile memory 25.

The access list request in FIG. 20 requests an accessible file name and the number of accessible clusters which first wireless access device 1 can copy from second non-volatile memory 25 to first non-volatile memory 15. Hence, the access list in FIG. 22 indicates a list of memory regions on second non-volatile memory 25 which first wireless access device 1 can access. The transfer direction indicates "R to L" which means a direction of copying a file from second non-volatile memory 25 to first non-volatile memory 15. The file name indicates a name of a file copied from second non-volatile memory 25 to first non-volatile memory 15. The transfer source logical address indicates a logical address of a region in which file data of the copy source is stored. The number of transfer clusters indicates a size of data to be copied as a number of clusters. When a file to be copied is divided and is stored in a plurality of regions on second non-volatile memory 25, plural sets of transfer source logical address and the numbers of transfer cluster are identified. In the example in FIG. 22, file name "FNAME1" is stored in two clusters from logical address "0x0002", file name "FNAME2" is stored in one cluster from logical address "0x0004", file name "FNAME3" is stored in one cluster from logical address "0x0006", file name "FNAME4" is stored in four clusters from logical address "0x0009", and file name "FNAME5" is stored in two of one cluster from logical address "0x000D" and one cluster from logical address "0x0010".

The access list request in FIG. 21 requests a transfer destination logical address and the number of clusters of second non-volatile memory 25 which can be copied, with respect to the file name and the number of clusters of the file copied from first non-volatile memory 15. The access list in FIG. 23 indicates a list of memory regions on second non-volatile memory 25 which first wireless access device 1 can access. The transfer direction indicates "L to R" which means a direction of copying file from first non-volatile memory 15 to second non-volatile memory 25. The file name indicates a name of a file copied from first non-volatile memory 15 to second non-volatile memory 25. The transfer destination logical address indicates a logical address of a region in which file data of the copy destination is stored. The number of transfer clusters indicates a size of data to be copied as a number of clusters. When a file to be copied is divided and is stored in a plurality of regions on second non-volatile memory 25, plural sets of transfer destination logical address and the numbers of transfer cluster are identified.

In the example in FIG. 23, file name "FNAME1" is divided and stored in two clusters from logical address "0x0003" and one cluster from logical address "0x0008", file name "FNAME2" is stored in one cluster from logical address "0x000A", file name "FNAME3" is divided and stored in four clusters from logical address "0x000F" and one cluster from logical address "0x0015" and file name "FNAME4" is stored in one cluster from logical address "0x0016".

In the present exemplary embodiment, formats of transfer directions, file names and the numbers of clusters included in the access list are the same as those of transfer directions, file names and the numbers of transfer clusters indicated in the access list request. However, information required for file copy operation only needs to be shared between first wireless access device 1 and second wireless access device 2, and different formats may be used for an access list request and an access list.

(S905) Access list controller 235 which operates on CPU 21 in second wireless access device 2 holds the access list generated by the operation in S904, in RAM 243 of second non-volatile memory controller 24.

(S906) Second non-volatile memory controller 24 generates a wireless packet for transmitting the access list generated by the operation in S904, to first wireless access device 1, and transmits the wireless packet to first wireless access device 1 through second wireless circuit 26.

(S907) First wireless circuit 16 receives the wireless packet including the access list transmitted from second wireless access device 2 by the operation in S906, and stores the received wireless packet in first wireless data buffer 161.

(S908) Access list controller 135 which operates on CPU 11 transfers wireless packet including the access list, from first wireless data buffer 161 to RAM 12 of first wireless access device 1. With this operation, one operation of obtaining an access list is completed.

(S909) Access list controller 135 which operates on CPU 11 checks whether or not obtaining all access lists required to access a file is completed. When obtaining the access lists is not completed (N), the flow returns to the operation in S901, and access list controller 134 continues operation of obtaining the access lists. When obtaining the access lists is completed (Y), the operation in Step 2 is completed.

Figure 10:
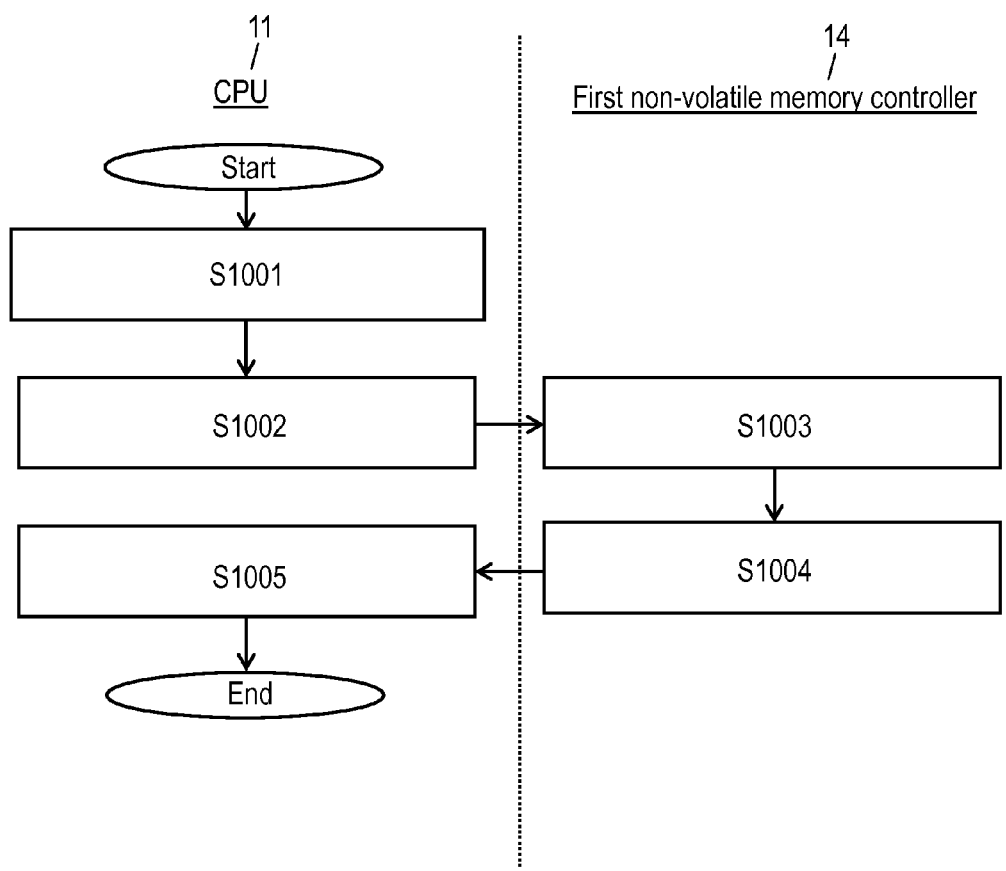
FIG. 10 is a flowchart illustrating details (Steps 3 to 5) of the file copy operation procedure according to the first exemplary embodiment.

Next, operation procedures of Step 3 to Step 5 will be described in detail with reference to FIG. 10. In the operation in Step 3 to Step 5, file copy controller 134 which operates on CPU 11 generates FS transfer list 121 based on the file system management information of first non-volatile memory 15 read in Step 1 and access list 122 obtained in Step 2, and inputs FS transfer list 121 to first non-volatile memory controller 14. And then first non-volatile memory controller 14 actually performs data copy operation. The operation described with reference to FIG. 10 is operation which is commonly applied both to copying files from first non-volatile memory 15 to second non-volatile memory 25 and to copying files from second non-volatile memory 25 to first non-volatile memory 15 except for details of operation contents in Step 5.

(S1001) File copy controller 134 which operates on CPU 11 generates FS transfer list 121 based on the file system management information of first non-volatile memory 15 read in Step 1 and access list 122 obtained in Step 2.

FIG. 13 is a view illustrating an example of FS transfer list 121. As shown in FIG. 13, FS transfer list 121 is a list including transfer directions indicating transfer directions of copy destinations and copy sources, logical addresses of regions in which file data of the copy destinations and the copy sources are stored, and numbers of transfer clusters indicating transfer sizes. The transfer directions include two types of "L to R" and "R to L". "L to R" means a copy from first non-volatile memory 15 to second non-volatile memory 25 and "R to L" means a copy from second non-volatile memory 25 to first non-volatile memory 15. The transfer source logical address indicates a start logical address of a region in which file data of the copy source is stored. The transfer destination logical address indicates a start logical address of a region in which file data of the copy destination is stored. The number of transfer clusters indicates a size of data to be copied as a number of clusters. FIG. 13 shows an example where transfer source logical addresses, transfer destination logical addresses and the numbers of transfer clusters are managed in cluster units such as 32 KB which are logical region management units of the file system. However, the transfer source logical addresses, transfer destination logical addresses and the numbers of transfer clusters only need to be information which makes it possible to indicate a copy region, and may be managed in sector units such as 512 B which are minimum access units of a non-volatile memory other than clusters.

Figure 12:
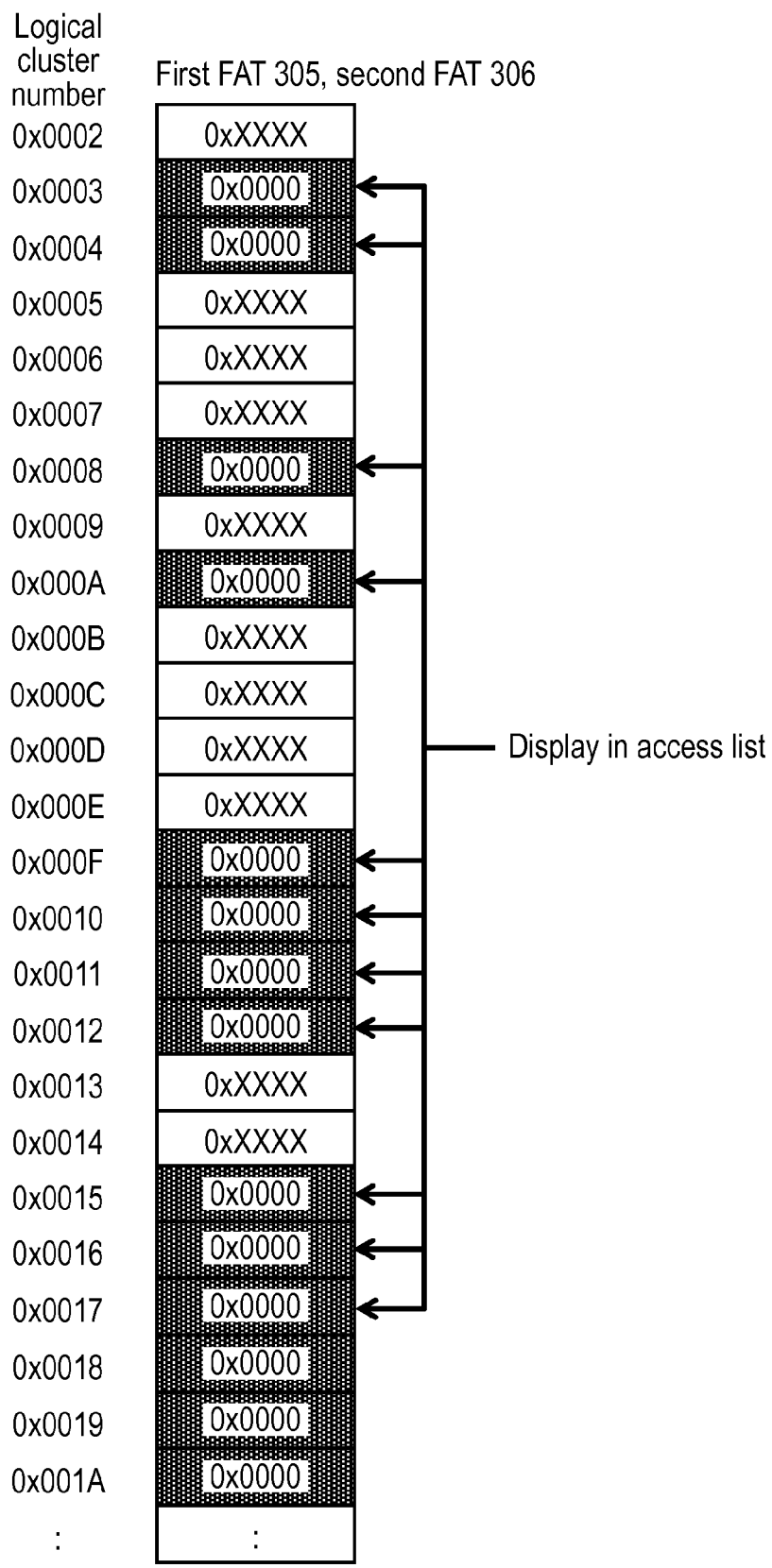
FIG. 12 is an explanatory view illustrating another example of the FAT table according to the first exemplary embodiment.

Next, a generation procedure of FS transfer list 121 will be described with reference to FIGS. 11, 12, 21 and 23. FIG. 11 shows an example of first FAT 305 and second FAT 306 included in the FAT file system constructed on the transfer source, that is, first non-volatile memory 15. FIG. 12 shows an example of first FAT 305 and second FAT 306 of the FAT file system constructed on the transfer destination, that is, second non-volatile memory 25. FIG. 23 shows access list 122 generated in response to an access list request from first FAT 305 and second FAT 306 included in the FAT file system constructed on second non-volatile memory 25 in FIG. 12. Further, data of a file to be transferred is stored on a series of links which start from a logical address region of logical cluster number "0x0002" and end at a logical address region of "0x0010". More specifically, three clusters of logical cluster numbers "0x0002" to "0x0004" of file name "FNAME1", one cluster of logical cluster number "0x0006" of file name "FNAME2", five clusters of logical cluster numbers "0x0009" to "0x000D" of file name "FNAME3", and one cluster of logical cluster "0x0010" of "FNAME4" are copied.

First, file copy controller 134 calculates one continuous region length which starts from copy start positions of first FAT 305 and second FAT 306 of the transfer source. In case of FIG. 11, one continuous region length is the number of clusters "3 clusters" whose logical cluster numbers are "0x0002" to "0x0004". Subsequently, the number of cluster "1 cluster" of logical cluster number "0x0006", the number of clusters "5 clusters" of logical cluster numbers "0x0009" to "0x000D" and the number of clusters "1 cluster" of logical cluster number "0x0010" are continuous region lengths. The access list request makes a request of a transfer destination logical address and the number of clusters of second non-volatile memory 25 which can be copied, with respect to the file name and the number of clusters of the file copied from first non-volatile memory 15. More specifically, the access list request includes transfer direction "L to R", file name "FNAME1" and the number of clusters "3".

The number of clusters "2 clusters" of logical cluster numbers "0x0003" and "0x0004" in first FAT 305 and second FAT 306 of the transfer destination in FIG. 12 is a continuous empty region length of one continuous empty region. Next, the number of clusters "1" of logical cluster number "0x0008", the number of cluster "1" of logical cluster number "0x000A", the number of clusters "4" of logical cluster numbers "0x000F" to "0x0012" and the number of clusters "5" of logical cluster numbers "0x0015" to "0x001A" are continuous empty region lengths.

Access list 122 in FIG. 23 is generated such that transfer direction is "L to R", and file name "FNAME1" is divided and stored in two clusters from logical address "0x0003" and one cluster from logical address "0x0008".

FS transfer list 121 is generated from first FAT 305 and second FAT 306 included in the FAT file system constructed on first non-volatile memory 15 in FIG. 11, and access list 122 in FIG. 23. In FIG. 11, a beginning of FAT 305 and second FAT 306 is the number of clusters "3 clusters" of logical cluster numbers "0x0002" to "0x0004". In FIG. 23, a beginning of access list 122 is two clusters from logical address "0x0003". The number of clusters of continuous region length and the number of clusters of the continuous empty region length are compared, and a smaller length of the continuous region length and the continuous empty region length is determined as the number of transfer clusters for one time. The "two clusters" of a smaller numerical value is the number of transfer clusters for one time.

List number 1 of FS transfer list 121 includes transfer direction "L to R", transfer source logical address "0x0002", transfer destination logical address "0x0003" and the number of transfer cluster "2". For remaining one cluster, list number 2 includes transfer direction "L to R", transfer source logical address "0x0004", transfer destination logical address "0x0008" and the number of transfer cluster "1". FS transfer list 121 is subsequently generated likewise. That is, list number 3 includes transfer direction "L to R", transfer source logical address "0x0006", transfer destination logical address "0x000A" and the number of transfer clusters "1". List number 4 includes transfer direction "L to R", transfer source logical address "0x0009", transfer destination logical address "0x000F" and the number of transfer clusters "4". List number 5 includes transfer direction "L to R", transfer source logical address "0x000D", transfer destination logical address "0x0015" and the number of transfer clusters "1". List number 6 includes transfer direction "L to R", transfer source logical address "0x0010", transfer destination logical address "0x0016" and the number of transfer clusters "1".

(S1002) File copy controller 134 which operates on CPU 11 transmits FS transfer list 121 generated by the operation in S1001, to first non-volatile memory controller 14, and instructs copying. Subsequently, copy operation is performed by first non-volatile memory controller 14, and file copy controller 134 which operates on CPU 11 stands by until the file copy operation is completed.

(S1003) First non-volatile memory controller 14 analyzes contents of FS transfer list 121 transmitted by the operation in S1002, and actually performs copy operation. The copy operation will be described in detail later.

(S1004) When the copy operation in S1003 is completed, first non-volatile memory controller 14 notifies file copy controller 134 which operates on CPU 11 that the copy operation has been completed.

(S1005) When file copy controller 134 which operates on CPU 11 receives a copy operation completion notice notified by the operation in S1004, file copy controller 134 which operates on CPU 11 in S1004 recognizes that the copy operation has been completed, and terminates the operation.

Thus, in the file copy operation according to the present exemplary embodiment, file copy controller 121 which operates on CPU 11 performs copy operation of up to generation of FS transfer list 121, and first non-volatile memory controller 14 performs subsequent actual copy operation. With this, CPU 11 and first internal bus 17 are not involved in actual copy operation, so that it is possible to copy files at a high speed such that the copy operation speed does not depend on performances of CPU 11 and first internal bus 17.

Further, only copying a file data body has been described as to explanation of the above file copy operation. However, information related to a copy destination file is actually written in first FAT 305, second FAT 306 and directory entry 308 existing in the non-volatile memory of the copy destination. Operation of updating file system management information is the same as conventional operation of updating file system management information in file system controller 132, and therefore will not be described in detail in the present exemplary embodiment. It is only necessary to perform the operation of updating of file system management information by file copy controller 134 which operates on CPU 11 at timing before or after the file copy operation described with reference to FIG. 10 when a transfer destination is first non-volatile memory 15. Further, it is only necessary to perform this operation by file copy controller 234 which operates on CPU 21 in advance at the time of transmission of an access list described with reference to FIG. 9, or after the file copy operation described with reference to FIG. 10 when the transfer destination is second non-volatile memory 25.

Figure 14:
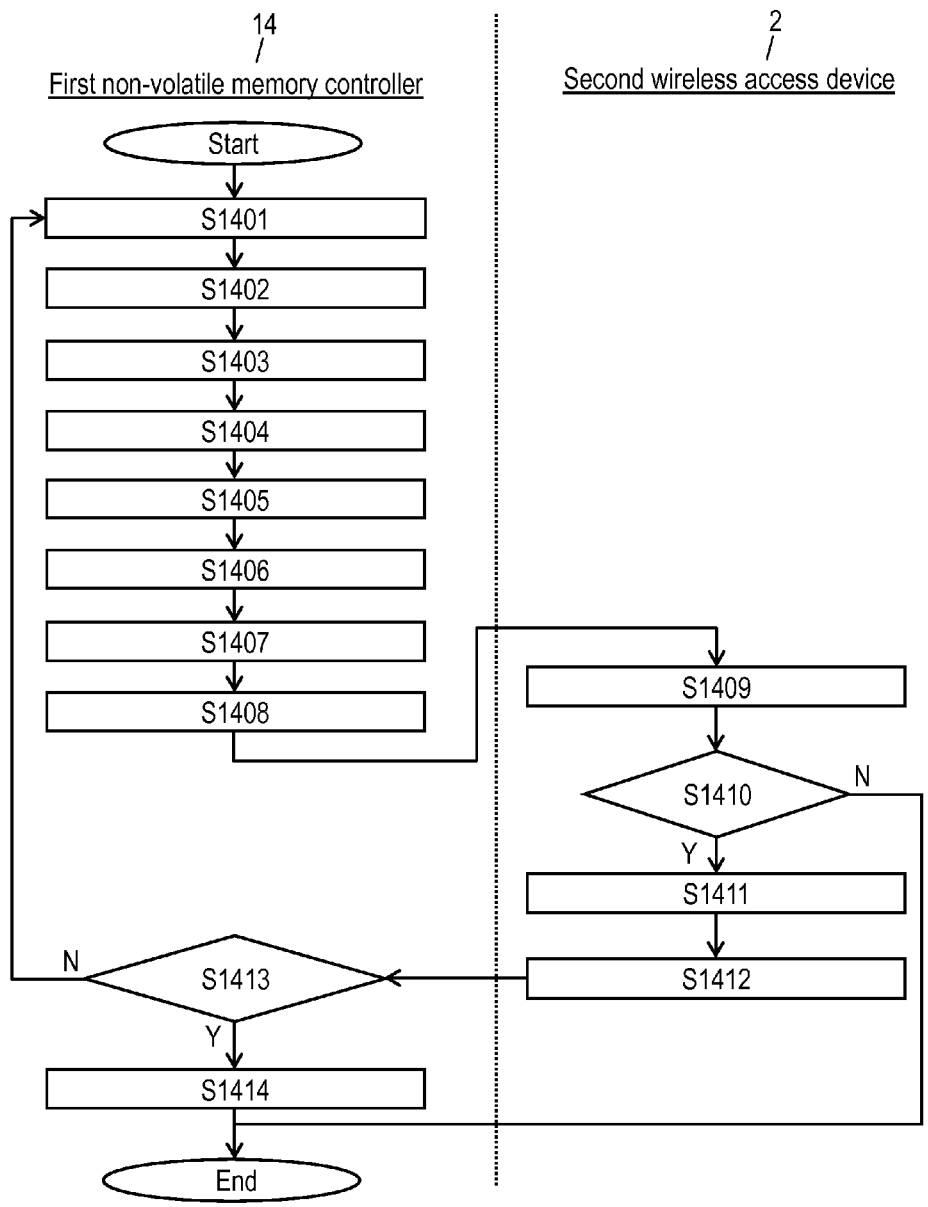
FIG. 14 is a flowchart illustrating details of the file copy operation procedure (copying from a local memory to a remote memory) using the FS transfer list according to the first exemplary embodiment.

Next, details of an operation procedure in a case where copying is performed from first non-volatile memory 15 to second non-volatile memory 25 in the copy operation using FS transfer list 121 in Step 5 will be described with reference to FIG. 14.

(S1401) Sequencer 141 in first non-volatile memory controller 14 refers to FS transfer list 121 from the head in row units, and checks the transfer direction. In the example of FS transfer list 121 in FIG. 13, the transfer direction in the first row is "L to R", and sequencer 141 recognizes a copy from first non-volatile memory 15 to second non-volatile memory 25.

(S1402) Sequencer 141 in first non-volatile memory controller 14 reads data from first non-volatile memory 15 since the transfer direction checked in S1401 is a copy from first non-volatile memory 15 to second non-volatile memory 25. Hence, sequencer 141 checks the transfer source logical address on FS transfer list 121, and generates a necessary command packet to perform reading with respect to a logical address targeting at first non-volatile memory 15.

(S1403) Sequencer 141 in first non-volatile memory controller 14 inputs the command packet generated by the operation in S1402, to first memory controller 145.

(S1404) First memory controller 145 in first non-volatile memory controller 14 transmits the inputted command packet to first non-volatile memory 15, and reads data from first non-volatile memory 15. The read Read data is stored in first memory data buffer 146.

(S1405) Sequencer 141 in first non-volatile memory controller 14 writes data to second non-volatile memory 25 since the transfer direction checked in S1401 is a copy from first non-volatile memory 15 to second non-volatile memory 25. Hence, sequencer 141 checks the transfer destination logical address on FS transfer list 121, and generates a command packet to perform writing with respect to a logical address targeting at second non-volatile memory 25.

(S1406) Sequencer 141 in first non-volatile memory controller 14 generates a wireless packet including the data read in S1404 and the command packet generated by the operation in S1405 in a payload on first memory data buffer 146.

(S1407) Sequencer 141 in first non-volatile memory controller 14 controls DMA controller 142 to DMA-transfer the wireless packet generated in S1406 to first wireless data buffer 161.

(S1408) Sequencer 141 in first non-volatile memory controller 14 transmits the wireless packet transferred to first wireless data buffer 161 in S1407, to second wireless access device 2 through first wireless circuit 16.

(S1409) When second wireless circuit 26 receives the wireless packet transmitted from first wireless access device 1 by the operation in S1408, second wireless circuit 26 stores the received wireless packet in second wireless data buffer 261. Subsequently, sequencer 241 in second non-volatile memory controller 24 controls DMA controller 242 to DMA-transfer Read data stored in a payload in the wireless packet on second wireless data buffer 261, to second memory data buffer 246.

(S1410) Sequencer 241 in second non-volatile memory controller 24 extracts the command packet (Write command) stored in the payload in the wireless packet transmitted from first wireless access device 1 by the operation in S1408, compares the logical address and the transfer size included in the Write command, and access list 122 held in RAM 243, and determines whether or not the logical address and the transfer size are included in a file copy target region indicated in access list 122. When the logical address and the transfer size are included in access list 122 (Y), it is determined that the Write command can be accepted and processed, and the flow moves to operation in S1411. When the logical address and the transfer size are not included in access list 122 (N), Sequencer 241 notifies CPU 21 that the Write command cannot be accepted and CPU 21 notifies first wireless access device 1 of an error and operation is terminated.

(S1411) When it is determined that the Write command received by the operation in S1410 can be accepted and processed, sequencer 241 in second non-volatile memory controller 24 inputs the Write command to second memory controller 245.

(S1412) Second memory controller 245 in second non-volatile memory controller 24 transmits the inputted command packet to second non-volatile memory 25, and writes the data stored in second memory data buffer 246, in second non-volatile memory 25. Further, second memory controller 245 generates the wireless packet including a Write completion notice after completing writing, and transmits the wireless packet to first wireless access device 1 through second wireless circuit 26.

(S1413) When first wireless circuit 16 receives the wireless packet transmitted from second wireless access device 2 by the operation in S1412 and sequencer 141 in first non-volatile memory controller 14 recognizes that Write has been completed, sequencer 141 checks whether or not there is an unprocessed list in FS transfer list 121. When operation does not come to the end of FS transfer list 121 and there is the unprocessed list (N), the flow returns to the operation in S1401 and sequencer 141 continues operation with respect to the rest of the list. When there is not the unprocessed list at the end of FS transfer list 121 (Y), the flow moves to the operation in S1414.

(S1414) Sequencer 141 in first non-volatile memory controller 14 notifies file copy controller 134 which operates on CPU 11 that copy operation has been completed, and terminates the operation. Subsequently, file copy controller 134 which operates on CPU 11 may notify the second wireless access device that the file copy has been completed.

Figure 15:
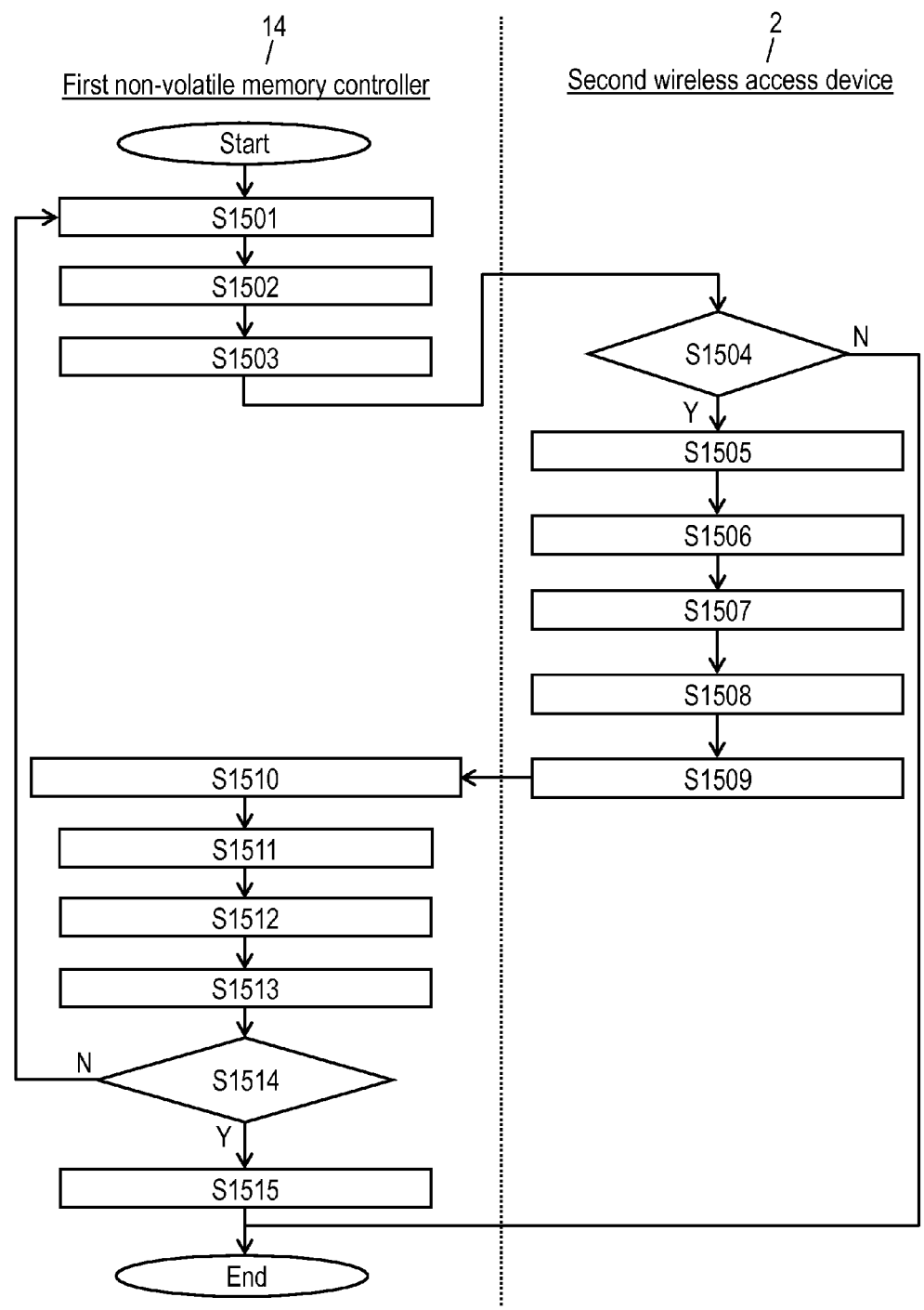
FIG. 15 is a flowchart illustrating details of the file copy operation procedure (copying from the remote memory to the local memory) using the FS transfer list according to the first exemplary embodiment.

Next, details of an operation procedure in a case where a file is copied from second non-volatile memory 25 to first non-volatile memory 15 in the copy operation using FS transfer list 121 in Step 5 will be described with reference to FIG. 15.

(S1501) Sequencer 141 in first non-volatile memory controller 14 refers to FS transfer list 121 from the head in row units, and checks the transfer direction. Assume a case where "R to L" is stored as the transfer direction and a file is copied from second non-volatile memory 25 to first non-volatile memory 15.

(S1502) Sequencer 141 in first non-volatile memory controller 14 reads data from second non-volatile memory 25 since the transfer direction checked in S1501 is a copy from second non-volatile memory 25 to first non-volatile memory 15. Hence, sequencer 141 checks the transfer source logical address on FS transfer list 121, and generates a command packet to perform reading with respect to a logical address targeting at second non-volatile memory 25.

(S1503) Sequencer 141 in first non-volatile memory controller 14 generates a wireless packet including the command packet generated by the operation in S1502 in a payload, and transmits the wireless packet to second wireless access device 2 through first wireless circuit 16.

(S1504) When second wireless circuit 26 receives the wireless packet transmitted from first wireless access device 1 by the operation in S1503, second wireless circuit 26 stores the received wireless packet in second wireless data buffer 261. Subsequently, sequencer 241 in second non-volatile memory controller 24 extracts the command packet (Read command) which is stored in the payload portion in the wireless packet and, compares the logical address and the transfer size included in the Read command, and access list 122 held in RAM 243, and determines whether or not the logical address and the transfer size are included in a file copy target region indicated in access list 122. When the logical address and the transfer size are included in access list 122 (Y), it is determined that the Read command can be accepted and processed, and the flow moves to operation in S1505. When the logical address and the transfer size are not included in access list 122 (N), sequencer 241 notifies CPU 21 that the Read command cannot be accepted and CPU 21 notifies first wireless access device 1 of an error and operation is terminated.

(S1505) When it is determined that the Read command received by the operation in S1504 can be accepted and processed, sequencer 241 in second non-volatile memory controller 24 inputs the Read command to second memory controller 245.

(S1506) Second memory controller 245 in second non-volatile memory controller 24 transmits the inputted command packet to second non-volatile memory 25, and reads the data from second non-volatile memory 25 to second memory data buffer 246.

(S1507) Sequencer 241 in second non-volatile memory controller 24 converts the data read by the operation in S1506 into a wireless packet on the second memory data buffer.

(S1508) Sequencer 241 in second non-volatile memory controller 24 controls DMA controller 242 to DMA-transfer the wireless packet on second memory data buffer 246 to second wireless data buffer 261.

(S1509) Sequencer 241 in second non-volatile memory controller 24 transmits the wireless packet on second wireless data buffer 261, to first wireless access device 1 through second wireless circuit 26.

(S1510) When first wireless circuit 16 receives the wireless packet transmitted from second wireless access device 2 by the operation in S1509, first wireless circuit 16 stores the received wireless packet in first wireless data buffer 161. Subsequently, sequencer 141 in first non-volatile memory controller 14 extracts the Read data stored in the payload of the wireless packet, and controls DMA controller 142 to DMA-transfer the Read data to first memory data buffer 146.

(S1511) Sequencer 141 in first non-volatile memory controller 14 writes data in first non-volatile memory 15 since the transfer direction checked in S1501 is a copy from second non-volatile memory 25 to first non-volatile memory 15. Hence, sequencer 141 checks the transfer destination logical address on FS transfer list 121, and generates a command packet to perform writing with respect to a logical address targeting at first non-volatile memory 15.

(S1512) Sequencer 141 in first non-volatile memory controller 14 inputs the command packet (Write command) generated by the operation in S1511, to first memory controller 145.

(S1513) First memory controller 145 in first non-volatile memory controller 14 transmits the inputted command packet to first non-volatile memory 15, and writes the Read data stored in first memory data buffer 146, in first non-volatile memory 15.

(S1514) Sequencer 141 in first non-volatile memory controller 14 checks whether or not there is an unprocessed list in FS transfer list 121 after the write operation in S1512 is completed. When operation does not come to the end of FS transfer list 121 and there is the unprocessed list (N), the flow returns to the operation in S1501 and sequencer 141 continues operation with respect to the rest of the list. When there is not the unprocessed list at the end of FS transfer list 121 (Y), the flow moves to the operation in S1515.

(S1515) Sequencer 141 in first non-volatile memory controller 14 notifies file copy controller 134 which operates on CPU 11 that the copy operation has been completed, and terminates the operation.

Thus, in the file copy operation using FS transfer list 121 according to the present exemplary embodiment of the present disclosure, first non-volatile memory controller 14 autonomously performs copy operation from first non-volatile memory 15 to second non-volatile memory 25 in accordance with the contents of FS transfer list 121.

As described above, when files are copied between first non-volatile memory 15 and second non-volatile memory 25 in the wireless access device according to the present exemplary embodiment, file copy controller 134 which operates on CPU 11 in first wireless access device 1 generates FS transfer list 121 and inputs FS transfer list 121 to first non-volatile memory controller 14, and first non-volatile memory controller 14 performs subsequent actual copy operation based on inputted FS transfer list 121. With this, CPU 11 and first internal bus 17 are not involved in actual copy operation, so that it is possible to copy files at a high speed with the copy operation speed not depending on performances of CPU 11 and first internal bus 17.

Further, in the wireless access device according to the present exemplary embodiment, access list controller 235 which operates on CPU 21 in second wireless access device 2 instructs a file copy operation target transfer source region or transfer destination region on second non-volatile memory 25, to first wireless access device 1 using access list 122. Then, the second non-volatile memory controller determines that a command can be accepted and processed when a logical address and a transfer size included in a Write or Read command received from first wireless access device 1 are included in a region indicated by the access list. Consequently, it is possible to easily control whether or not to permit an access from first wireless access device 1 to second non-volatile memory 25 without CPU 21 even upon file copy operation. Further, it is possible to restrict a range of memory regions of second non-volatile memory 25 which second wireless access device 2 uses to copy files, and prevent unauthorized writing or reading of data.

Second Exemplary Embodiment

Figure 24:
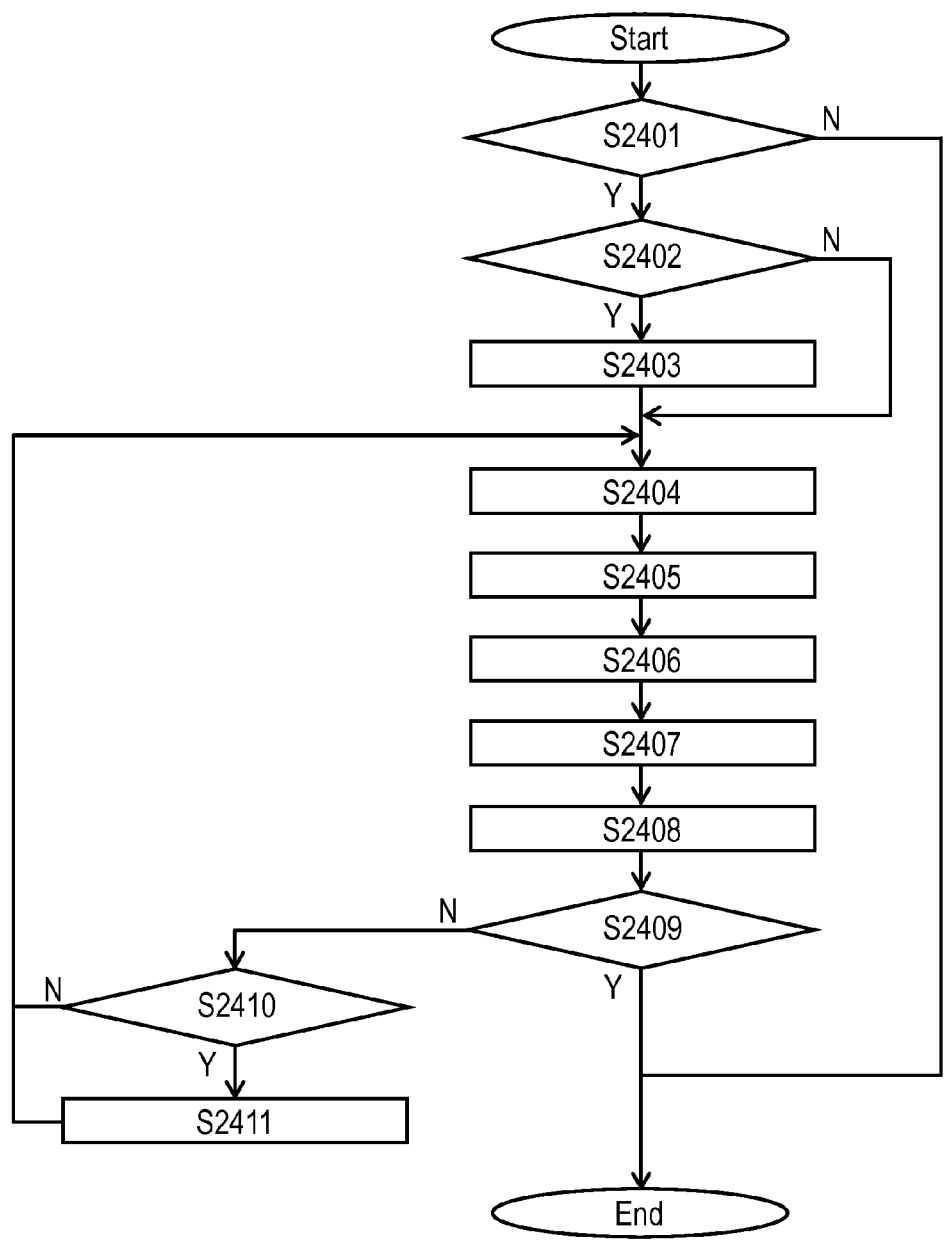
FIG. 24 is a flowchart illustrating details of a command division control operation procedure according to a second exemplary embodiment.

FIG. 24 is a flowchart illustrating details of a command division control operation procedure performed by a non-volatile memory controller in a wireless access device according to the second exemplary embodiment.

In file copy operation described in the first exemplary embodiment, when a transfer size included in a Write command or a Read command instructed by first wireless access device 1 is larger (e.g. several MBs or several GBs), a program which operates on CPU 21 in the second wireless access device cannot access second non-volatile memory 25 while the file copy operation is performed. Second non-volatile memory controller 24 in second wireless access device 2 according to the present exemplary embodiment divides the Write command or the Read command received from first wireless access device 1 into predetermined sizes, and executes the command. A case where the Read command is received will be described in detail below with reference to FIG. 24. The command division operation procedure is the same except for a difference in a data transfer direction even when the Write command is received, and therefore will not be described.

(S2401) Sequencer 241 in second non-volatile memory controller 24 checks that a logical address and a transfer size included in the Read command received from first wireless access device 1 are included in a region indicated by access list 122. When the logical address and the transfer size are included in access list 122 (Y), the flow moves to operation in S2402. When the logical address and the transfer size are not included in access list 122 (N), sequencer 241 notifies CPU 21 that the Read command cannot be accepted and CPU 21 notifies first wireless access device 1 of an error and operation is terminated. This is the same operation as that in S1504 in FIG. 15.

(S2402) When it is determined that the Read command received by the operation in S2401 can be accepted and processed, sequencer 241 in second non-volatile memory controller 24 determines whether or not the transfer size exceeds a predetermined transfer length, when the transfer size exceeds the predetermined transfer length (Y), the flow performs operation in S2403. In this regard, the predetermined transfer length is a size determined in accordance with a function or a specification of second wireless access device 2, may be a fixed value such as 4 KB, 1 MB or 16 MB, and may be set to RAM 243 in second non-volatile memory controller 24 or the like by the file copy controller which operates on CPU 21.

(S2403) When it is determined by the operation in S2402 that the transfer size included in the Read command exceeds the predetermined transfer length, sequencer 241 in second non-volatile memory controller 24 makes settings to divide the transfer size into the predetermined transfer lengths. When, for example, the transfer size included in the Read command is 1 MB, and a predetermined transfer length is 256 KB, sequencer 241 in second non-volatile memory controller 24 makes settings to issue Read commands of 256 KB of a transfer size, to second non-volatile memory 25 four times.

(S2404) Sequencer 241 in second non-volatile memory controller 24 inputs the Read command to second memory controller 245. When sequencer 241 divides the Read command received from first wireless access device 1 into Read commands of predetermined transfer lengths by the operation in S2403, sequencer 241 inputs the divided commands.

(S2405) Second memory controller 245 in second non-volatile memory controller 24 transmits the inputted command to second non-volatile memory 25, and reads the data from second non-volatile memory 25 to second memory data buffer 246.

(S2406) Sequencer 241 in second non-volatile memory controller 24 converts, on the second memory data buffer, the Read data read by the operation in S2405 into a wireless packet.

(S2407) Sequencer 241 in second non-volatile memory controller 24 controls DMA controller 242 to DMA-transfer the wireless packet on second memory data buffer 246 to second wireless data buffer 261.

(S2408) Sequencer 241 in second non-volatile memory controller 24 transmits the wireless packet on second wireless data buffer 261, to first wireless access device 1 through second wireless circuit 26.

(S2409) When completing processing the commands inputted to second memory controller 245, sequencer 241 in second non-volatile memory controller 24 checks whether or not all commands divided into the predetermined transfer lengths have been completed. When processing all commands is completed (Y), it is determined that processing the Read command received from first wireless access device 1 is completed, the operation is terminated.

(S2410) In the operation S2409, when there are commands, divided into the predetermined transfer lengths, which have not been processed (N), sequencer 241 in second non-volatile memory controller 24 checks whether or not another command to access second non-volatile memory 25 from the program which operates on CPU 21 in second wireless access device 2 is received. When the command is not received (N), the flow returns to S2404, and sequencer 241 processes the commands divided into the predetermined transfer lengths.

(S2411) In the operation in S2410 when the command to access second non-volatile memory 25 is received from the program which operates on CPU 21 in second wireless access device 2 (Y), sequencer 241 in second non-volatile memory controller 24 inputs the another command received from CPU 21, to second memory controller 245, performs Read or Write operation with respect to second non-volatile memory 25, then the flow returns to the operation in S2404 and processes the commands which have not been processed and have been divided into the predetermined transfer lengths.

As described above, in the wireless access device according to the present exemplary embodiment, in file copy operation, even when a transfer size included in a Write command or a Read command instructed by first wireless access device 1 is large, the second non-volatile memory controller in the second wireless access device divides commands into the predetermined transfer lengths, executes the commands, and preferentially executes another command to access second non-volatile memory 25 from the program which operates on CPU 21 in second wireless access device 2 after executing each divided command. Consequently, the program which operates on CPU 21 in the second wireless access device can access second non-volatile memory 25 even while the file copy operation is performed, and it is possible to improve convenience of second wireless access device 2.

Third Exemplary Embodiment

FIG. 25 is a flowchart illustrating a file read operation procedure of a wireless access device according to the third exemplary embodiment.

First wireless access device 1 according to the present exemplary embodiment reads files from second non-volatile memory 25 using access list 122 described with reference to FIG. 22 in the first exemplary embodiment. This operation is performed when, for example, a movie file stored in second non-volatile memory 25 is read, and is decoded and is played back by first wireless access device 1. This file read operation procedure will be described with reference to FIG. 25. In addition, the operation procedure in which first wireless access device 1 writes files in second non-volatile memory 25 is the same procedure as read operation except for data transfer, and therefore will not be described.

(S2501) A program which operates on CPU 11 in first wireless access device 1 identifies a logical address of a read target file referring to access list 122.

(S2502) The program which operates on CPU 11 in first wireless access device 1 instructs first non-volatile memory controller 14 to read data from the logical address based on the logical address identified by the operation in S2501.

(S2503) First non-volatile memory controller 14 in first wireless access device 1 generates a Read command for second non-volatile memory 25 according to the read instruction.

(S2504) First non-volatile memory controller 14 in first wireless access device 1 converts the Read command generated in S2503 into a wireless packet, and transmits the wireless packet to second wireless access device 2.

(S2505) When receiving the Read command transmitted from first wireless access device 1 by the operation in S2504, second wireless access device 2 reads file data from second non-volatile memory 25, converts the file data into a wireless packet and transmits the wireless packet to first wireless access device 1. This operation is the same operation as that in from S1504 to S1509 in FIG. 15, and therefore will not be described in detail.

(S2506) When receiving the wireless packet transmitted from second wireless access device 2 by the operation in S2505, first wireless circuit 16 stores the received wireless packet in first wireless data buffer 161.

(S2507) Sequencer 141 in first non-volatile memory controller 14 notifies CPU 11 that the Read operation has been completed.

(S2508) The program which operates on CPU 11 transfers the file data included in the wireless packet, from first wireless data buffer 161 to RAM 12 in first wireless access device 1, and performs data operation.

As described above, first wireless access device 1 according to the present exemplary embodiment generates a Read command with respect to second non-volatile memory 25 using access list 122 described in the first exemplary embodiment, transmits the Read command to the second wireless access device, and reads files. Consequently, it is possible to perform operation of reading and writing files using access list 122 without being restricted to file copy operation, and easily control whether or not to permit an access to second non-volatile memory 25 without CPU 21. Consequently, when the program which operates on CPU 11 in first wireless access device 1 reads or writes files from or in second non-volatile memory 25, it is possible to control an accessible region and prevent unauthorized writing or reading of data.

Another Exemplary Embodiment

The present disclosure has been described based on the above exemplary embodiments. However, the present disclosure is not limited to the above exemplary embodiments. The exemplary embodiments can be changed without departing from the spirit of the present disclosure. The numerical values described in the present exemplary embodiments are exemplary, and other values may be used.

Figure 16:
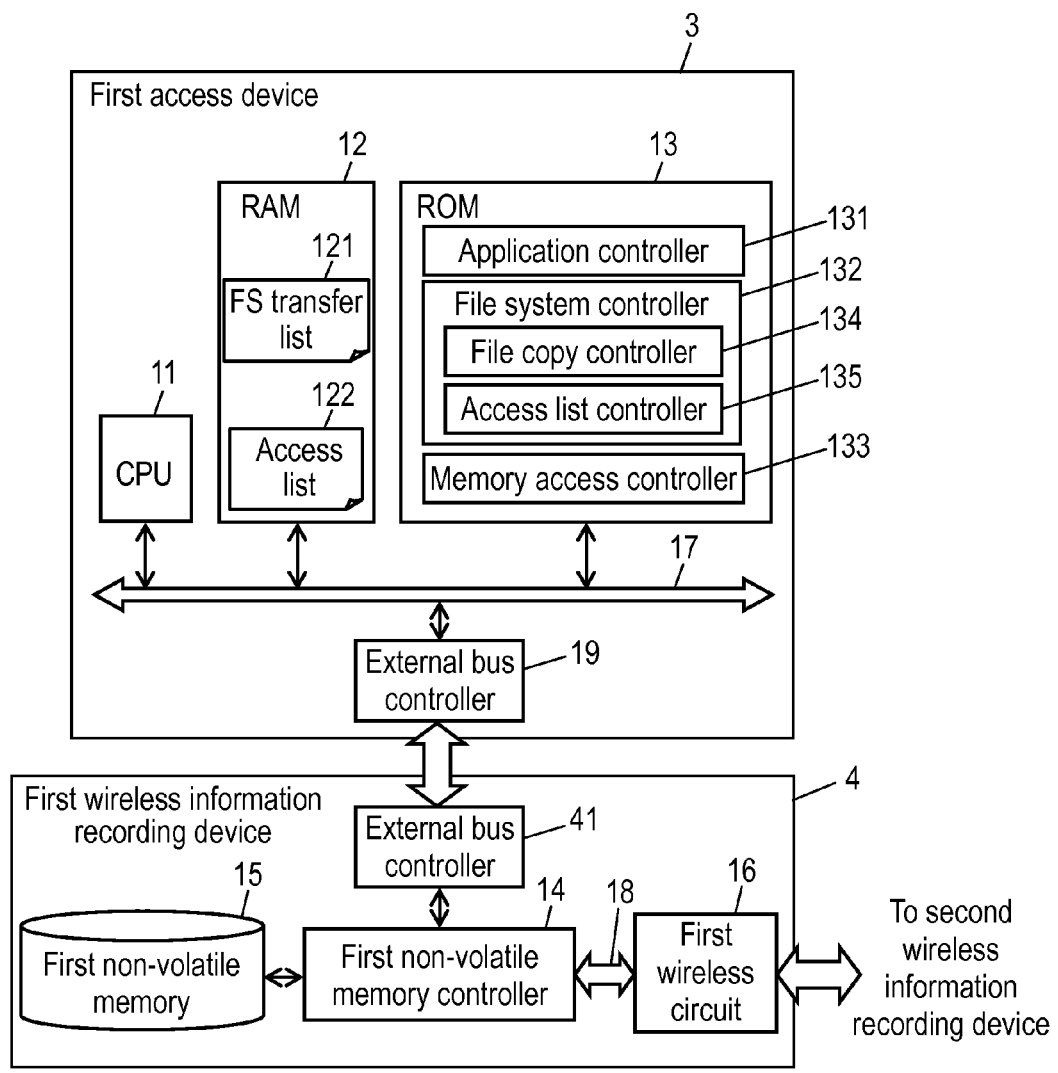
FIG. 16 is an explanatory view illustrating a configuration of another example of a first wireless access device according to the first exemplary embodiment.
Figure 17:
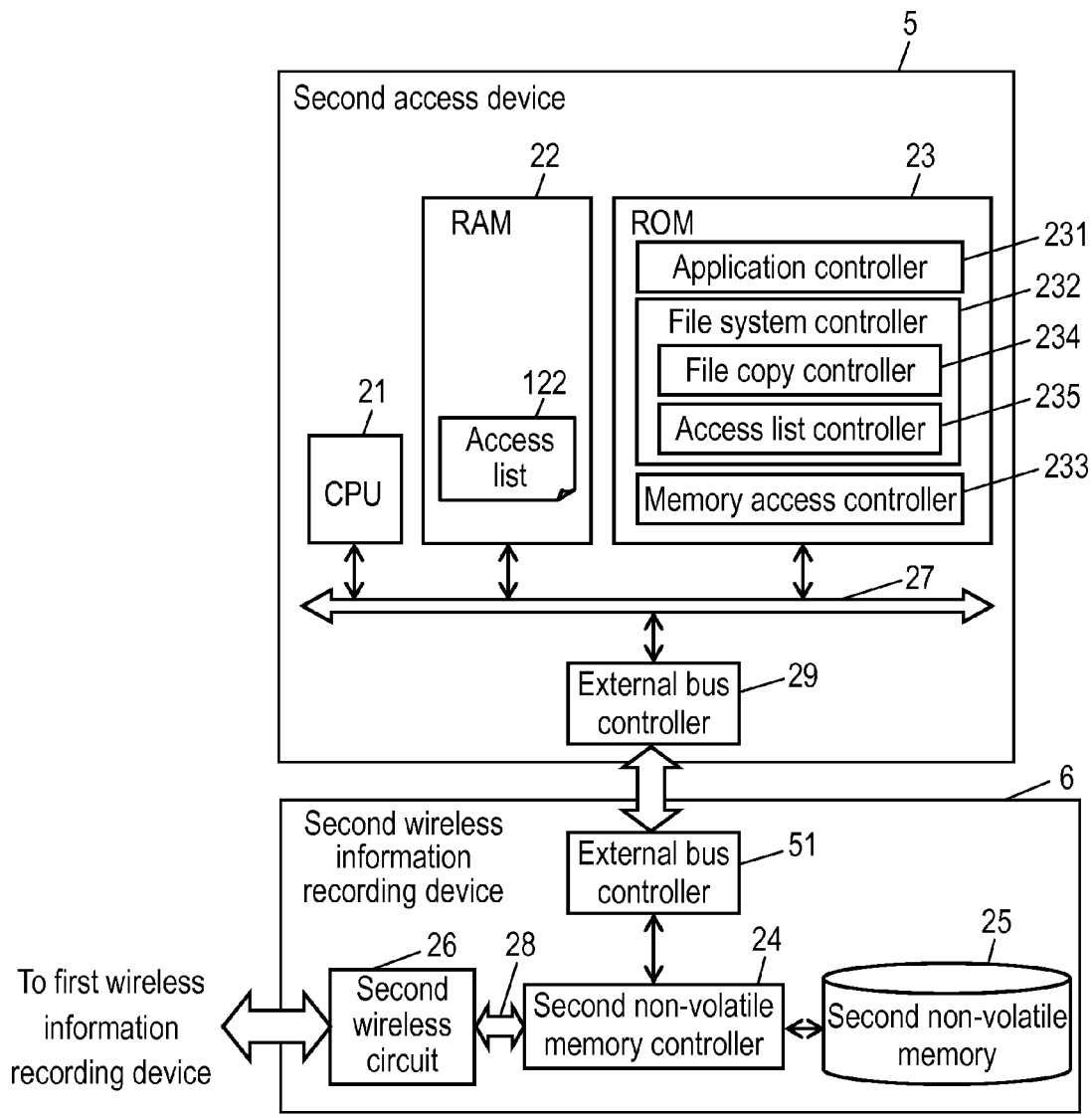
FIG. 17 is an explanatory view illustrating a configuration of another example of a second wireless access device according to the first exemplary embodiment.

The description has been made, with reference to FIG. 1, on the configuration where single first wireless access device 1 includes CPU 11 in which file copy controller 134 and access list controller 135 operate and first non-volatile memory controller 14, and single second wireless access device 2 includes CPU 21 in which file copy controller 234 and access list controller 235 operate and second non-volatile memory controller 24. However, another configuration may be employed. For example, first wireless access device 1 may be separately configured as two of first access device 3 and first wireless information recording device 4 as shown in FIG. 16, and second wireless access device 2 may be separately configured as second access device 5 and second wireless information recording device 6 to provide a wireless access system as shown in FIG. 17. More specifically, first access device 3 includes CPU 11, RAM 12, ROM 13 and external bus controller 19 which are connected with each other through first internal bus 17. First wireless information recording device 4 further includes first non-volatile memory 15 and external bus controller 41 connected to first non-volatile memory controller 14, and first wireless circuit 16 connected through second internal bus 18. External bus controller 19 and external bus controller 41 are external bus controllers such as USBs (Universal Serial Bus) or PCI Expresses (Peripheral Component Interconnect Express), through which first access device 3 and first wireless information recording device 4 may be configured to be connected. Second access device 5 includes CPU 21, RAM 22, ROM 23 and external bus controller 29 which are connected with each other through first internal bus 27. Second wireless information recording device 6 includes second non-volatile memory 25 and external bus controller 51 connected to second non-volatile memory controller 24, and second wireless circuit 26 connected through second internal bus 28. External bus controller 29 and external bus controller 51 are external bus controllers such as USBs or PCI Expresses through which second access device 5 and second wireless information recording device 6 may be configured to be connected.

With this configuration, by installing in ROMs 13 and 23 software corresponding to file copy controllers 134 and 234 and access list controllers 135 and 235, first access device 3 and second access device 5 sides can appropriate a hardware configuration of the conventional access device as it is and be applied to the present disclosure.

FS transfer list 121 in FIG. 13 has been described as an example. As long as sufficient information to enable data to be copied between first non-volatile memory 15 and second non-volatile memory 25 is included, FS transfer list 121 is not limited to this format and may adopt another format.

For example, FS transfer list 123 as shown in FIG. 18 may be used. FS transfer list 123 shown in FIG. 18 is configured to associate a data storage region of one transfer source file and data storage regions of n (n is an integer equal to or more than 2) transfer destination files such that data of the data storage region of the one transfer source file is copied to the data storage regions of the n transfer destination files. For example, FIG. 18 illustrates an example where the number of data storage regions of transfer destination files is two. As information included in list number 1, logical address regions of transfer sources of three continuous clusters starting from "0x0002" are associated with logical address regions of transfer destinations of two continuous clusters starting from "0x0003" and a logical address region of a transfer destination of one cluster of "0x0008".

As another example, FS transfer list 124 as shown in FIG. 19 may be used. FS transfer list 124 shown in FIG. 19 is configured to associate a data storage region of one transfer destination file and data storage regions of n (n is an integer equal to or more than 2) transfer source files such that data of the data storage regions of the n transfer source files is copied to the data storage region of one transfer destination file. For example, FIG. 19 illustrates an example where the number of transfer source regions is two. As information included in list number 5, logical address regions of transfer destinations of two continuous clusters starting from "0x0015" are associated with logical address regions of transfer sources of two clusters of "0x000D" and "0x0010". In both of the examples in FIGS. 18 and 19, for a list number associated on 1-to-1 an invalid logical address of "0xFFFF" is set to a region of transfer destination logical address 2 or a region of transfer source logical address 2.

Thus, by generating a FS transfer list in which transfer destination logical addresses and transfer source logical addresses are associated on 1-to-n (n is an integer equal to or more than 2) or on n-to-1 (n is an integer equal to or more than 2), it is possible to reduce a size of the FS transfer list and optimize copy operation. Further, both of settings of 1-to-n and n-to-1 may be combined to generate a FS transfer list in which settings of 1-to-n and n-to-1 are mixed.

FIG. 28 shows an example of FS transfer list 125 in which the settings of both of 1-to-n and n-to-1 are combined. For description of FS transfer list 125, an example of first FAT 305 and second FAT 306 included in a FAT file system constructed on first non-volatile memory 15 which is the transfer source in FIG. 11, and an example of first FAT 305 and second FAT 306 of a FAT file system constructed on second non-volatile memory 25 which is the transfer destination in FIG. 29 are used. FIG. 28 shows an example where n is 2. As information included in list number 1, logical address regions of transfer sources of three continuous clusters starting from "0x0002" are associated with logical address regions of transfer destinations of two continuous clusters starting from "0x0003" and a logical address region of one cluster starting from "0x0008". As information included in list number 3, logical address regions of transfer sources of five continuous clusters starting from "0x0009" and one cluster starting from "0x0010" are associated with logical address regions of transfer destinations of six continuous clusters starting from "0x000F". List number 2 is associated on 1-to-1, and an invalid logical address of "0xFFFF" is set to transfer destination logical address 2 or a region of transfer source logical address 2.

Thus, by associating transfer destination logical addresses and transfer source logical addresses by mixing the settings of both of 1-to-n (n is an integer equal to or more than 2) and n-to-1 (n is an integer equal to or more than 2), it is possible to support various combinations of a number of continuous empty clusters of transfer destination logical addresses and a number of continuous empty clusters of transfer destination logical addresses, and optimize copy operation.

The examples of an access list request have been described with reference to FIGS. 20 and 21. However, as long as information which is sufficient for first wireless access device 1 to obtain an access list from second wireless access device 2 is included, a format of the access list is not limited to this format, and may adopt another format. For example, a single access list request may include an access list request of different transfer directions of "R to L" and "L to R".

Further, the examples of an access list have been described with reference to FIGS. 22 and 23. However, as long as sufficient information to enable files to be copied between first non-volatile memory 15 and second non-volatile memory 25 is included, a format of the access list is not limited to this format and may adopt another format.

When, for example, a file is copied from second non-volatile memory 25 to first non-volatile memory 15, as shown in FIG. 26, access list controller 135 which operates on CPU 11 in first wireless access device 1 may obtain a file list which is a list of directories and files from access list controller 235 which operates on CPU 21 in second wireless access device 2, then send an address request including a specified name of a file to be copied, and obtain access list 122 including information of a transfer source logical address and size information related to the file specified in the address request, from access list controller 235 which operates on CPU 21 in second wireless access device 2. When, for example, a directory such as DIR1 is included in the obtained file list, access list controller 135 which operates on CPU 11 in first wireless access device 1 may further obtain a file list included in directory DIR1 from access list controller 235 which operates on CPU 21 in second wireless access device 2.

Further, when, for example, a file is copied from first non-volatile memory 15 to second non-volatile memory 25, as shown in FIG. 27, access list controller 135 which operates on CPU 11 in first wireless access device 1 may send an empty region obtaining request obtained by listing empty regions required to copy the file, to access list controller 235 which operates on CPU 21 in second wireless access device 2, and obtain access list 122 including start addresses and continuous empty region lengths of the empty regions from access list controller 235 which operates on CPU 21 in second wireless access device 2. Furthermore, when a request size is a particular value such as 0, access list controller 135 may obtain all empty regions in second non-volatile memory 25 or obtain file system management information constructed on second non-volatile memory 25. Still further, after finishing copying the file from first non-volatile memory 15 to second non-volatile memory 25, file copy controller 134 or access list controller 135 which operates on CPU 11 in first wireless access device 1 may transmit write file information including a copied file name, start address, and attribute information to file copy controller 234 or access list controller 235 which operates on CPU 21 in second wireless access device 2. With this, it is possible to update the file system management information of second non-volatile memory 25.

The operation procedure of dividing a Write command or a Read command received by second non-volatile memory controller 24 from first wireless access device 1 into predetermined transfer lengths and executing the command has been described with reference to FIG. 24. However, access list controller 235 which operates on CPU 21 in second wireless access device 2 may include the predetermined transfer lengths in advance in access list 122 and notify first wireless access device 1, file copy controller 134 which operates on CPU 11 in first wireless access device 1 may add FS transfer list 121 such that a transfer size of copy operation is the predetermined transfer length or less.

As described above, the exemplary embodiments have been described as an exemplary technique according to the present disclosure. Therefore, the accompanying drawings and the detailed description have been provided.

Accordingly, the components disclosed in the accompanying drawings and the detailed description include not only components which are required to solve the problem but also components which are not required to solve the problem in order to describe the above exemplary technique.

It should not be immediately understood that those components which are not required are necessary simply because these components which are not required are disclosed in the accompanying drawings and the detailed description.

Further, the above exemplary embodiments are the exemplary technique according to the present disclosure, and consequently can be variously changed, replaced, added and omitted in the range of the claims or the range equivalent to the claims.

What is claimed is:

1. An access device which copies data between a file in a file system constructed on a first memory in the access device and a file in a file system constructed on a second memory in another access device, the access device comprising:
    a central processing unit (CPU);
    an access list controller, arranged to operate on the CPU, which obtains an access list, which lists copy target regions in the file system constructed on the second memory, from the other access device;
    a file copy controller, arranged to operate on the CPU, which identifies a logical address of a transfer source and a logical address of a transfer destination based on first file system management information read from the file system constructed on the first memory and the access list, and generates a transfer list which lists the logical addresses together with a transfer data size; and
    a memory controller which controls the first memory, wherein
    the file copy controller inputs the generated transfer list to the memory controller,
    the memory controller autonomously controls copying between the first memory and the second memory based on the transfer list, and
    the access list includes information of an empty region in the file system of the second memory or information of a region in which a copy target file in the file system of the second memory is stored.

2. The access device according to claim 1, wherein the access list includes one or more sets of a logical address and a length of an empty region in the file system of the second memory, when copying from the first memory to the second memory is controlled.

3. The access device according to claim 1, wherein the access list includes one or more sets of a logical address and a length of a region in which the copy target file in the file system of the second memory is stored, when copying from the second memory to the first memory is controlled.

4. The access device according to claim 1, wherein, when copying, the memory controller
    generates an access command for accessing the first memory and accesses the first memory, and
    generates another access command for accessing the second memory, further converts the other access command into a wireless packet, wirelessly transmits the wireless packet to the other access device, and accesses the second memory in the other access device.

5. The access device according to claim 1, wherein, for a data storage region of a transfer source file and a data storage region of a transfer destination file, the file copy controller
    calculates a length of one continuous region included in the data storage region of the transfer source file and a length of one continuous empty region in which data of the transfer destination file is stored based on the first file system management information and the access list,
    compares the length of the continuous region and the length of the continuous empty region, and
    generates the transfer list using the smaller length of the continuous region and the length of the continuous empty region as a copy operation unit.

6. The access device according to claim 1, wherein the transfer list generated by the file copy controller is configured to associate one data storage region of a transfer source file and n (n is an integer equal to or more than 2) data storage regions of a transfer destination file, to copy n data of the one data storage region of the transfer source file to the n data storage regions of the transfer destination file.

7. The access device according to claim 1, wherein the transfer list generated by the file copy controller is configured to associate one data storage region of a transfer destination file and n (n is an integer equal to or more than 2) data storage regions of a transfer source file, to copy n data of the data storage regions of the transfer source file to the one data storage region of the transfer destination file.

8. An access device which copies data between a file in a file system constructed on a first memory in another access device and a file in a file system constructed on a second memory, the access device comprising:
    a central processing unit (CPU);
    a memory controller which controls the second memory,
    a file copy controller, arranged to operate on the CPU, which controls the memory controller; and
    an access list controller, arranged to operate on the CPU, which generates an access list,
    wherein
    the file copy controller reads a second file system management information from the file system constructed on the second memory using an access command transmitted from the other access device,
    the access command requests an accessible area in the second memory,
    the access list controller generates the access list based on the access command and the second file system management information,
    the access list includes information of an empty region in the file system of the second memory or information of a region in which a copy target file in the file system of the second memory is stored, and the memory controller transmits the access list to the other access device.

9. The access device according to claim 8, wherein the access list is held in the access device, and when a logical address and a transfer length set to the access command extracted from the data transmitted from the other access device are included in an accessible region of the access list, the access device accepts the access command and accesses the second memory.

10. The access device according to claim 8, wherein, when a transfer length set to the access command extracted from the data transmitted from the other access device exceeds a predetermined transfer length, the access device divides the access command into a plurality of commands of the predetermined transfer length, and accesses the second memory.

11. The access device according to claim 8, wherein the CPU causes a program to read the file stored in the second memory or write the file in the second memory, when the program reads the file stored in the second memory or writes the file in the second memory, the program specifies a read or write target logical address and a transfer length to the memory controller based on the access list, and the memory controller transfers data between the second memory and the CPU based on the logical address and the transfer length.

12. An information recording device which copies data between a file in a file system constructed on a first memory in the information recording device and a file in a file system constructed on a second memory in another information recording device, the information recording device comprising:

a central processing unit (CPU);

an access list controller, arranged to operate on the CPU, which obtains an access list, which lists copy target regions in the file system constructed on the second memory; and a file copy controller, arranged to operate on the CPU, which identifies a logical address of a transfer source and a logical address of a transfer destination based on first file system management information read from the file system constructed on the first memory and the access list, and generates a transfer list which lists the logical addresses together with a transfer data size, wherein the file copy controller controls coping data between the first memory and the second memory by inputting the generated transfer list to the information recording device, and the access list includes information of an empty region in the file system of the second memory or information of a region in which a copy target file in the file system of the second memory is stored.

13. An access system which copies data between a file in a file system constructed on a first memory in a first access device and a file in a file system constructed on a second memory in a second access device, wherein the first access device includes a central processing unit (CPU);

an access list controller, arranged to operate on the CPU, which obtains an access list, which lists copy target regions in the file system constructed on the second memory, from the second access device;

a file copy controller, arranged to operate on the CPU, which identifies a logical address of a transfer source and a logical address of a transfer destination based on first file system management information read from the file system constructed on the first memory and the access list, and generates a transfer list which lists the logical addresses together with a transfer data size; and a memory controller which controls the first memory, the file copy controller inputs the generated transfer list to the memory controller, the memory controller autonomously controls copying data between the first memory and the second memory based on the inputted transfer list, and the access list includes information of an empty region in the file system of the second memory or information of a region in which a copy target file in the file system of the second memory is stored.

14. The access device according to claim 1, wherein the access device and the other access device copy the file using wireless communication.

* * * * *